United States Patent
Kobayashi et al.

(10) Patent No.: US 7,785,231 B2
(45) Date of Patent: Aug. 31, 2010

(54) AUTOMATIC TRANSMISSION CONTROLLING APPARATUS AND METHOD

(75) Inventors: Nobufusa Kobayashi, Anjo (JP); Toshio Sugimura, Nagoya (JP); Tomohiro Asami, Nisshin (JP); Takaaki Tokura, Nagoya (JP); Tomohiro Kondo, Toyota (JP); Masami Kondo, Toyota (JP); Masaharu Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 497 days.

(21) Appl. No.: 11/896,712

(22) Filed: Sep. 5, 2007

(65) Prior Publication Data

US 2008/0066567 A1 Mar. 20, 2008

(30) Foreign Application Priority Data

Sep. 15, 2006 (JP) ............................. 2006-251844

(51) Int. Cl.
*F16H 61/26* (2006.01)

(52) U.S. Cl. .................... 477/158; 477/127; 477/159

(58) Field of Classification Search ................ 477/115, 477/127, 148, 154, 156, 158, 159
See application file for complete search history.

(56) References Cited

U.S. PATENT DOCUMENTS 5,669,849 A * 9/1997 Tabata et al. ................ 477/102
6,328,673 B1 * 12/2001 Monowa et al. ............. 477/120
6,397,695 B1 6/2002 Okada et al.
6,736,757 B2 * 5/2004 Kubo et al. .................. 477/144
6,849,030 B2 * 2/2005 Yamamoto et al. .......... 477/159
7,074,158 B2 * 7/2006 Watanabe et al. ........... 477/159

FOREIGN PATENT DOCUMENTS

| JP | A-62-41452 | 2/1987 |
|---|---|---|
| JP | A-7-332480 | 12/1995 |
| JP | A-9-291838 | 11/1997 |
| JP | A 10-068334 | 3/1998 |
| JP | A-10-213216 | 8/1998 |
| JP | A 11-159603 | 6/1999 |
| JP | A 2000-145940 | 5/2000 |
| JP | A-2002-168332 | 6/2002 |
| JP | A-2003-56690 | 2/2003 |
| JP | A-2003-83439 | 3/2003 |
| JP | A-2004-11747 | 1/2004 |
| JP | A-2004-138105 | 5/2004 |

* cited by examiner

*Primary Examiner*—Ha D. Ho
(74) *Attorney, Agent, or Firm*—Oliff & Berridge, PLC

(57) ABSTRACT

A gear shift controlling apparatus of an automatic transmission for a vehicle has a synchronization-time engagement pressure correcting device that, before synchronization of gear-shifting, makes an increase correction of an engagement pressure of the disengaged-side engaging element by a first prescribed amount, to cause an input shaft rotational speed immediately before synchronizing of the automatic transmission to approach a rotational speed calculated by multiplying an output shaft rotational speed by a gear ratio of a gear after gear-shifting the automatic transmission.

13 Claims, 14 Drawing Sheets

FIG. 2

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

O:ENGAGED (O):ENGAGED ONLY DURING ENGINE BRAKING

AUTOMATIC TRANSMISSION CONTROLLING APPARATUS AND METHOD

INCORPORATION BY REFERENCE

The disclosure of Japanese Patent Application No. JP-2006-251844 filed on Sep. 15, 2006 including the specification, drawings, and abstract is incorporated herein by reference in its entirety.

BACKGROUND OF THE INVENTION

1. Field of the Invention

In an automatic transmission for a vehicle having a plurality of friction engaging elements (hereinafter "engaging elements") and a one-way clutch, the invention relates to automatic transmission controlling apparatus and method that reduces gear shifting shock when a gear shift is performed that engages the one-way clutch from the disengaged condition.

2. Description of the Related Art

A known automatic transmission has a one-way clutch and engaging elements that allow transmission of torque in one rotational direction but does not transmit torque in the reverse direction. In the automatic transmission described in the Japanese Patent Application Publication No. 11-159603 (JP-A-11-159603), for example, when a gear shift is performed in which the engaging element is disengaged and also the one-way clutch is engaged from the disengaged condition, when the one-way clutch goes into the engaged condition, gear shifting shock occurs.

In order to reduce the gear shifting shock, the JP-A-11-159603 discloses an automatic transmission that, when a gear shift is performed in the direction in which a disengaged-side engaging element is disengaged from the engaged condition and a one-way clutch is engaged from the disengaged condition, makes the speed of deforming of the disengaged-side engaging element small. The Japanese Patent Application Publication No. 10-68334 (JP-A-10-68334) discloses an automatic transmission that, when a downshift is executed, controls the ignition timing of an engine toward the retard angle side to reduce the engine torque and, by extension, reduces the input torque to the automatic transmission, thereby softening the gear shifting shock occurring when the one-way clutch is synchronized.

It is difficult, however, for the art noted in the JP-A-11-159603 to control the rate of change of the rotational speed of the input side of the clutch, and gear shifting shock still occurs when the one-way clutch engages. Also, the automatic transmission according to the art of the JP-A-10-68334 cannot soften the gear shifting shock in the case in which the engine cooling water temperature is low and retard angle control is prohibited. Even if the engine torque is made zero, because of the influence of reaction force to the decelerating of the vehicle a gear shifting shock occurs when the one-way clutch is synchronized. Additionally, when the engine ignition timing is in retard angle control, if the ignition timing of the engine is excessively retarded, there is a possibility that the engine will stall, and for that reason the degree of freedom of control is reduced.

SUMMARY OF THE INVENTION

The invention provides a gear shift controlling apparatus and method for automatic transmission for a vehicle that, performs gear-shifting by disengaging a disengaged-side engaging element and by engaging a one-way clutch, reduces a gear shifting shock.

The aspect of the invention relates to a gear shift controlling apparatus and method for automatic transmission for a vehicle, in which the automatic transmission for a vehicle establishes a plurality of gears having different gear ratios by selectively engaging a plurality of engaging elements and a one-way clutch, and performs gear-shifting by disengaging a disengaged-side engaging element and by engaging the one-way clutch from a disengaged condition when the vehicle speed is reduced. The gear shift controlling apparatus and method has a synchronization-time engagement pressure correcting device and step that, before synchronization of gear-shifting, makes an increase correction of an engagement pressure of the disengaged-side engaging element by a first prescribed amount, to cause an input shaft rotational speed immediately before synchronizing of the automatic transmission to approach a rotational speed calculated by multiplying an output shaft rotational speed by a gear ratio of a gear after gear-shifting the automatic transmission.

According to the aspect, the gear shift controlling apparatus and method can cause the rate of change of the input shaft rotational speed immediately before of synchronization of the automatic transmission to approach the rate of change of a rotational speed immediately before of synchronization calculated by multiplying an output shaft rotational speed by a gear ratio of a gear after gear-shifting, thereby reducing the occurrence of gear shifting shock.

BRIEF DESCRIPTION OF THE DRAWINGS

The foregoing and further objects, features, and advantages of the invention will become apparent form the following description of preferred embodiments with reference to the accompanying drawings, wherein like numerals are used to represent like elements, and wherein:

FIG. 2 is an operation table describing the operation of the engaging elements in the automatic transmission of FIG. 1 that establishes a plurality of gears;

DETAILED DESCRIPTION OF AN EMBODIMENT

Figure 1:
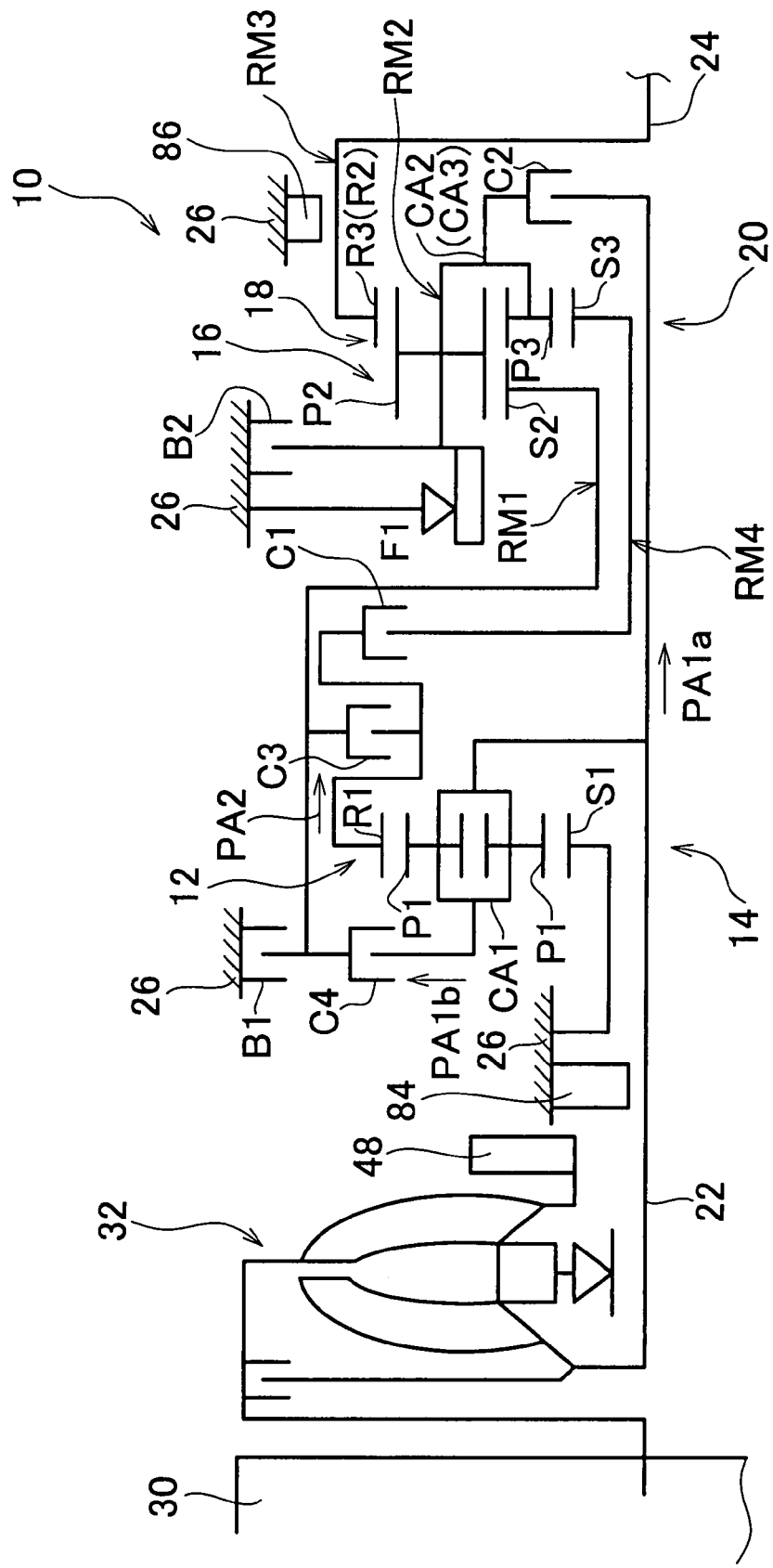
FIG. 1 is a schematic interconnection diagram describing the configuration of an automatic transmission for a vehicle of the embodiment.

FIG. 1 is a schematic interconnection diagram describing the configuration of an automatic transmission for a vehicle (hereinafter "automatic transmission) 10, and FIG. 2 is an operation table describing the operation of the engaging elements in the automatic transmission 10 that establishes a plurality of gears.

The automatic transmission 10 has, inside of a transmission case (hereinafter "case") 26, which is a non-rotating member mounted to the vehicle body, a first transmission part 14 having a double-pinion type first planetary gear unit 12 as a main part, and a second transmission part 20 having a single-pinion type second planetary gear unit 16 and a double-pinion type third planetary gear unit 18 as main parts, these being disposed on a common axis.

The first transmission part 14 and the second transmission part 20 gear-shift the rotation of the input shaft 22 and the rotation is output from the output shaft 24. The input shaft 22 corresponds to the input rotating member and, in this embodiment, is the turbine shaft of a torque converter 32 rotationally driven by an engine 30 that is the power source for running. The output shaft 24 corresponds to the output rotating member that, via a differential gear unit (final gear reducer) and then a pair of axles (not illustrated), rotationally drives the left and right driven wheels. The automatic transmission 10 is configured to be substantially symmetrical with respect to the axle center, the bottom half of which is omitted in the schematic interconnection diagram of FIG. 1.

The first planetary gear unit 12 has a sun gear S1, a plurality of pairs of pinion gears P1 that are mutually meshed, a carrier CA1 that supports the pinion gear P1 to enable both axial rotation and orbital revolution thereof, and a ring gear R1 meshed with the sun gear S1 via the pinion gears P1, the sun gear S1, the carrier CA1 and the ring gear R1 forming three rotating elements. The carrier CA1 is linked to and rotationally driven by the input shaft 22, and the sun gear S1 is fixed as one with the case 26. The ring gear R1 functions as an intermediate output member, is caused to rotate at a reduced speed relative to the input shaft 22, and transmits rotation of the input shaft 22 to the second transmission part 20.

In this embodiment, the path along which the rotation of the input shaft 22 is transmitted without a change of speed to the second transmission part 20 is a first intermediate output path PA1 that transmits rotation at a pre-established gear ratio (1.0). The first intermediate output path PA1 includes a direct path PA1a that transmits rotation from the input shaft 22 to the second transmission part 20 without passing through the first planetary gear unit 12, and an indirect path PA1b that transmits rotation from the input shaft 22 to the second transmission part 20 via the carrier CA1 of the first planetary gear unit 12.

The path transmitting from the input shaft 22 to the second transmission part 20 via the carrier CA1, the pinion gear P1 disposed at the carrier CA1, and the ring gear R1 is a second intermediate output path PA2 that changes (reduces) the speed of and transmits rotation of the input shaft 22 with a gear ratio that is larger than that of the first intermediate output path PA1 (that is, larger than 1.0).

The second planetary gear unit 16 has a sun gear S2, a pinion gear P2, and a carrier CA2 that supports the pinion gear P2 to enable both axial rotation and orbital revolution thereof, and a ring gear R2 meshed with the sun gear S2 via the pinion gear P2.

The third planetary gear unit 18 has a sun gear S3, a plurality of pairs of pinion gears P2 and P3 that are mutually meshed, a carrier CA3 that supports the pinion gears P2 and P3 to enable both rotation and orbital rotation thereof, and a ring gear R3 meshed with the sun gear S3 via the pinion gears P2 and P3.

The second planetary gear unit 16 and the third planetary gear unit 18, by being partially linked together, form four rotating elements, RM1 to RM4. Specifically, the sun gear S2 of the second planetary gear unit 16 forms the first rotating element RM1, the carrier CA2 of the second planetary gear unit 16 and the carrier CA3 of the third planetary gear unit 18 are linked together as one to form the second rotating element RM2. The ring gear R2 of the second planetary gear unit 16 and the ring gear R3 of the third planetary gear unit 18 are mutually linked together as one to form the third rotating element RM3, and the sun gear S3 of the third planetary gear unit 18 forms the fourth rotating element RM4.

In the second planetary gear unit 16 and the third planetary gear unit 18, carriers CA2 and the CA3 are formed by a commonly shared member, and the ring gears R2 and R3 are formed by a commonly shared member. The pinion gear P2 of the second planetary gear unit 16 is a Ravigneaux-type planetary gear train that serves also as the second pinion gear of the third planetary gear unit 18.

The automatic transmission 10, in order to establish a plurality of gears having different gear ratios has, as engaging elements, a first clutch C1, a second clutch C2, a third clutch C3, and a fourth clutch C4 (hereinafter referred to as "clutches C" when no particular distinction is made), and first and second brakes B1 and B2 (hereinafter referred to as "brakes B" when no particular distinction is made).

The first rotating element RM1 (the sun gear S2) is selectively linked to the case 26, via the first brake B1, to stop the rotation thereof, is selectively linked, via the third clutch C3, to the ring gear R1 (that is, the second intermediate output path PA2) of the first planetary gear unit 12, which is an intermediate output member, and is further selectively linked, via the fourth clutch C4, to the carrier CA1 of the first planetary gear unit 12 (that is, the indirect path PA1b of the first intermediate output path PA1).

The second rotating element RM2 (the carriers CA2 and CA3) is selectively linked, via the second brake B2, to the case 26 to stop the rotation thereof, and is selectively linked, via the second clutch C2, to the input shaft 22 (that is, the direct path PA1a of the first intermediate output path PA1).

The third rotating element RM3 (the ring gears R2 and R3) is linked as one with the output shaft 24 to output rotation. The fourth rotating element RM4 (the sun gear S3) is selectively linked, via the first clutch C1, to the ring gear R1. A one-way clutch F1 is provided between the second rotating element RM2 and the case 26 in parallel with the second brake B2 to allow forward rotation (rotation in the same direction as the input shaft 22) but prevent reverse rotation of the second rotating element RM2.

The operating table of FIG. 2 is a chart describing the operating conditions of the clutches C and the brakes B when the various gears (gear ratio) are established in the automatic transmission 10. In this table, circles indicate the engaged condition, the circle enclosed in parentheses indicates the engaged condition only during engine braking, and blanks indicate the disengaged condition. Because the one-way clutch F1 is provided in parallel with the second brake B2 that establishes the first gear 1st, at the time of starting (accelerating) the second brake B2 does not necessary need to be engaged. The gear ratios for each gear are appropriately established by the gear ratios $\rho 1$, $\rho 2$, and $\rho 3$ of the first planetary gear unit 12, the second planetary gear unit 16, and the third planetary gear unit 18.

Figure 3:
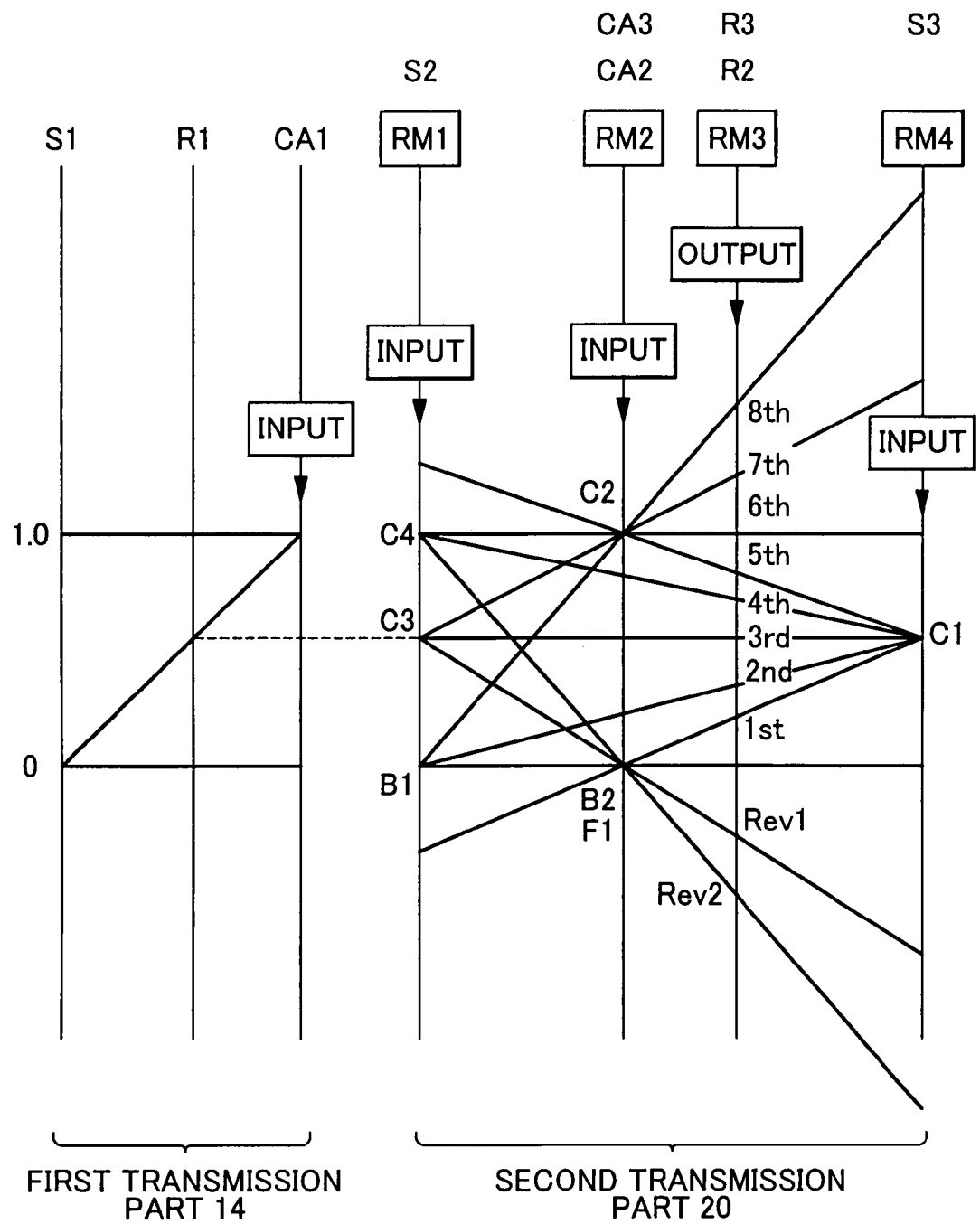
FIG. 3 is a nomogram in which the rotational speeds of each of the rotating elements in a first transmission part and a second transmission part provided in the automatic transmission of FIG. 1 can be represented as straight lines.

FIG. 3 is a nomogram in which the rotational speeds of each of the rotating elements in the first transmission part 14 and the second transmission part 20 can be represented as straight lines, in which the lower horizontal lines represent the rotational speed of "0" and the upper horizontal lines represent the rotational speed of "1.0" that is a rotational speed the same as that of the input shaft 22.

The vertical lines associated with the first transmission part 14 represent, in sequence from the left, the sun gear S1, the ring gear R1, and the carrier CA1, the spacing therebetween being determined in response to the gear ratio $\rho 1$ of the first planetary gear unit 12 (that is, the ratio of (sun gear S1 number of teeth)/(ring gear R1 number of teeth)).

The four vertical lines associated with the second transmission part 20 represent, in sequence from the left, the first rotating element RM1 (the sun gear S2), the second rotating element RM2 (the carrier CA2 and the carrier CA3), the third rotating element RM3 (the ring gear R2 and the ring gear R3), and the fourth rotating element RM4 (the sun gear S3), the spacing therebetween being determined in response to the gear ratio $\rho 2$ of the second planetary gear unit 16 and the gear ratio $\rho 3$ of the third planetary gear unit 18.

As shown in FIG. 2 and FIG. 3, when the first clutch C1 and the second brake B2 are engaged to rotate the fourth rotating element RM4 at a speed reduced via the first transmission part 14 relative to that the input shaft 22 and to stop the rotation of the second rotating element RM2, the third rotating element RM3, which is linked to the output shaft 24, is caused to rotate at a speed indicated by 1st, thereby establishing the first gear (1st), having the largest gear ratio (which is (rotational speed of the input shaft 22)/(rotational speed of the output shaft 24)).

When the first clutch C1 and the first brake B1 are engaged to rotate the fourth rotating element RM4 at a speed reduced via the first transmission part 14 relative to that the input shaft 22 and to stop the rotation of the first rotating element RM1, the third rotating element RM3 is caused to rotate at a speed indicated by 2nd, thereby establishing the second gear (2nd), having a gear ratio that is smaller than that of the first gear (1st).

When the first clutch C1 and the third clutch C3 are engaged to rotate the fourth rotating element RM4 and the first rotating element RM1 at a speed reduced via the first transmission part 14 relative to that of the input shaft 22 and to cause the second transmission part 20 to rotate in concert therewith, the third rotating element RM3 is caused to rotate at a speed indicated by 3rd, thereby establishing the third gear (3rd), having a gear ratio that is smaller than that of the second gear (2nd).

When the first clutch C1 and the fourth clutch C4 are engaged to rotate the fourth rotating element RM4 at a speed reduced via the first transmission part 14 relative to that of the input shaft 22 and to cause the first rotating element RM1 to rotate in concert with the input shaft 22, the third rotating element RM3 is caused to rotate at a speed indicated by 4th, thereby establishing the fourth gear (4th), having a gear ratio that is smaller than that of the third gear (3rd).

When the first clutch C1 and the second clutch C2 are engaged to rotate the fourth rotating element RM4 at a speed reduced via the first transmission part 14 relative to that of the input shaft 22 and to cause the second rotating element RM2 to rotate in concert with the input shaft 22, the third rotating element RM3 is caused to rotate at a speed indicated by 5th, thereby establishing the fifth gear (5th), having a gear ratio that is smaller than that of the fourth gear (4th).

When the second clutch C2 and the fourth clutch C4 are engaged to rotate the second transmission part 20 in concert with the input shaft 22, the third rotating element RM3 is caused to rotate at a speed indicated by 6th, this being the same speed as the input shaft 22, thereby establishing the sixth gear (6th), having a gear ratio that is smaller than that of the fifth gear (5th). The gear ratio of the sixth gear (6th) is 1.0.

When the second clutch C2 and the third clutch C3 are engaged to rotate the first rotating element RM1 at a speed reduced via the first transmission part 14 relative to the input shaft 22 and to cause the second rotating element RM2 to rotate in concert with the input shaft 22, the third rotating element RM3 is caused to rotate at a speed indicated by 7th, thereby establishing the seventh gear (7th), having a gear ratio that is smaller than that of the sixth gear (6th).

When the second clutch C2 and the first brake B1 are engaged to rotate the second rotating element RM2 in concert with the input shaft 22 and to stop the rotation of the first rotating element RM1, the third rotating element RM3 is caused to rotate at a speed indicated by 8th, thereby establishing the eighth gear (8th), having a gear ratio that is smaller than that of the seventh gear (7th).

When the third clutch C3 and the second brake B2 are engaged to rotate the first rotating element RM1 at a speed reduced via the first transmission part 14 and to stop the rotation of the second rotating element RM2, the third rotating element RM3 rotates in reverse at a speed indicated by Rev1, thereby establishing the first reverse gear Rev1, having the largest gear ratio in the reverse direction.

When the fourth clutch C4 and the second brake B2 are engaged to rotate the first rotating element RM1 in concert with the input shaft 22 and to stop the rotation of the second rotating element RM2, the third rotating element RM3 is caused to rotate in reverse at a speed indicated by Rev2, thereby establishing the second reverse gear (Rev2), having a gear ratio that is smaller than that of the first reverse gear (Rev1). The first reverse gear (Rev1) and the second reverse gear (Rev2) correspond, respectively, to the first gear and second gear in the reverse rotation direction.

The automatic transmission 10 of this embodiment as described above establishes a plurality of gears having different gear ratios by selectively engaging a plurality of engaging elements, specifically the clutches C and the brakes B. By the first transmission part 14, which has the two intermediate output paths PA1 and PA2, which have different gear ratios, and the second transmission part 20, which has two sets of planetary gear units 16, 18, the automatic transmission 10 switches the engagement of the four clutches C1 to C4 and the two brakes B1, B2 to achieve eight forward gears, thereby achieving compactness and facilitating installation in a vehicle.

As is clear from the operation table of FIG. 2, gear shifting between gears can be made by a so-called clutch-to-clutch operation of any two of the clutches C and the brakes B. The clutches C and brakes B are hydraulic type friction engagement devices, the engagement of which is controlled by a hydraulic actuator, such as a multiplate disc clutch or brake.

Figure 4:
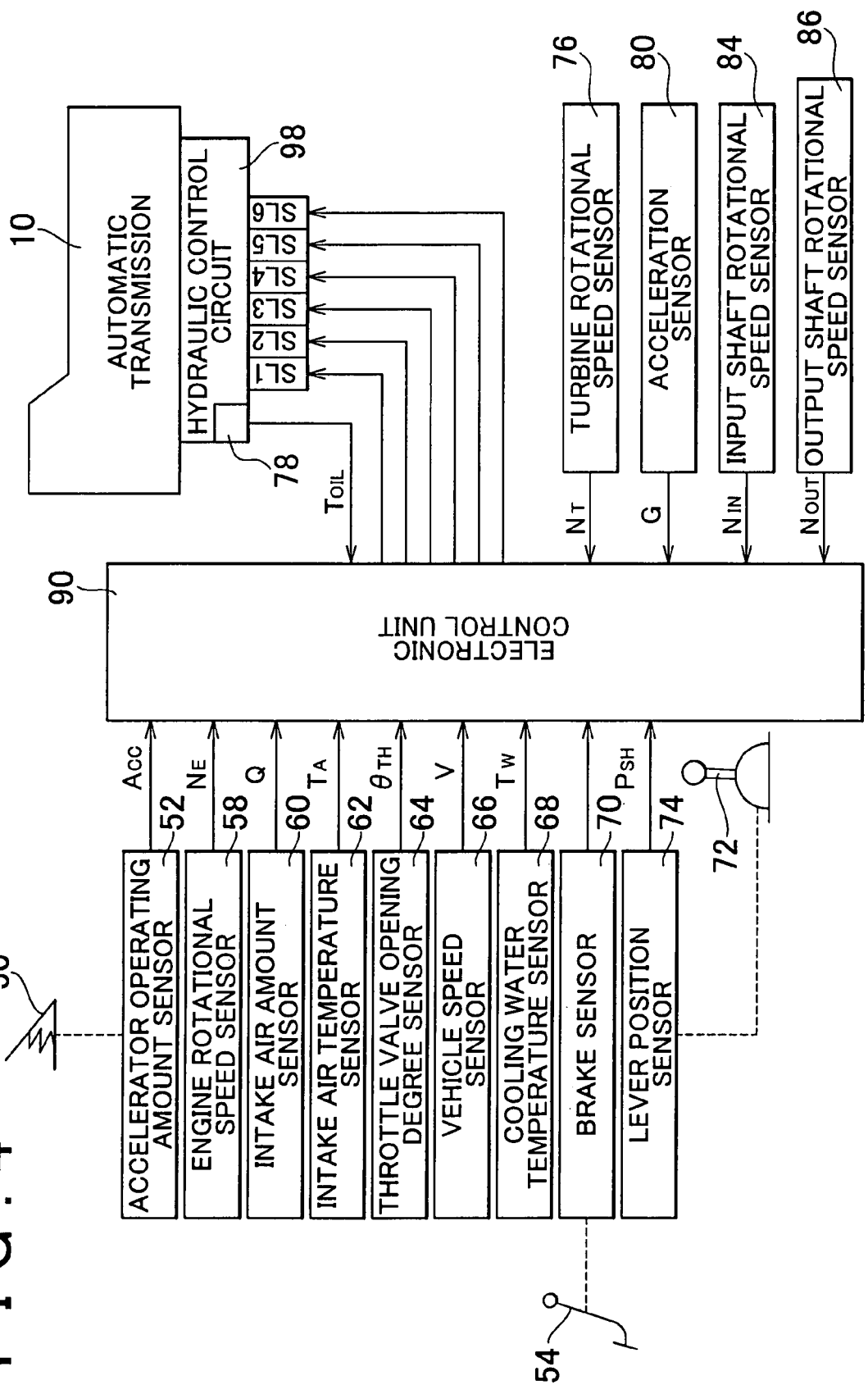
FIG. 4 is a block diagram describing the main part of a control system provided in a vehicle for controlling the automatic transmission as shown in FIG. 1.

FIG. 4 is a block diagram describing the main part of the control system provided in a vehicle to control, for example, the automatic transmission 10 shown in FIG. 1. The electronic control unit (hereinafter "ECU") 90 shown in FIG. 4 is implemented to include a microcomputer having such elements as a CPU, RAM, ROM, and an input/output interface. The temporary storage function of the RAM is used while executing a program stored beforehand in the ROM to perform signal processing to execute output control of the engine 30 and gear shift control of the automatic transmission 10, with division between a part for engine control and a part for gear shift control being made as necessary.

In FIG. 4, the acceleration operation amount Acc of an accelerator pedal 50 is detected by the accelerator operation amount sensor 52, and a signal representing the accelerator operation amount Acc is supplied to the ECU 90. Because the accelerator pedal 50 is depressed a large amount in response to an amount of output demanded by an driver, accelerator pedal 50 corresponds to the accelerator operating member and the acceleration operation amount Acc corresponds to the output demand amount.

Also, in FIG. 4 a signal representing the depression amount $\theta_{SC}$ of the brake pedal 54 of the usually used foot brake is supplied to the electronic control unit 90. Because the brake pedal 54 is depressed a large amount in response to a deceleration demand from the driver, the brake pedal 54 corresponds to the brake operating member and the associated depression amount $\theta_{SC}$ corresponds to the brake operating amount.

Sensors provided include an engine rotational speed sensor 58 to detect the rotational speed $N_E$ of the engine 30, an intake air amount sensor 60 to detect the intake air amount Q of the engine 30, an intake air temperature sensor 62 to detect the temperature $T_A$ of the intake air, a throttle valve opening sensor 64 with an idle switch to detect the fully closed condition (idle condition) and the opening $\theta_{TH}$ of the electronic throttle valve of the engine 30, a vehicle speed sensor 66 to detect the vehicle speed V (corresponding to the rotational speed $N_{OUT}$ of the output shaft 24), a cooling water temperature sensor 68 to detect the cooling water temperature $T_W$ of the engine 30, a brake sensor 70 to detect whether the brake pedal 54 is depressed and the depression amount $\theta_{SC}$ thereof, a lever position sensor 74 to detect the lever position (operating position) $P_{SH}$ of the shift lever 72, a turbine rotational speed sensor 76 to detect the turbine rotational speed $N_T$ (that is, the rotational speed $N_{IN}$ of the input shaft 22), an automatic transmission oil temperature sensor 78 to detect the automatic transmission oil temperature $T_{OIL}$, which is the temperature of the operating fluid inside the hydraulic control circuit 98, and an acceleration sensor 80 to detect the acceleration (including deceleration) G of the vehicle.

These sensors and switches output to the electronic control unit 90 signals that represent, for example, the engine rotational speed $N_E$, the intake air amount Q, the intake air temperature $T_A$, the throttle valve opening $\theta_{TH}$, the vehicle speed V, the engine cooling water temperature $T_W$, the depression amount $\theta_{SC}$ indicating whether the brake pedal is operated and the depression amount thereof, the lever position $P_{SH}$ of the shift lever 72, the turbine rotational speed $N_T$, the automatic transmission oil temperature $T_{OIL}$, and the acceleration (including deceleration) G of the vehicle.

The main part of the control system is provided with an input shaft rotational speed sensor 84 for detecting the rotational speed $N_{IN}$ of the input shaft 22 of the automatic transmission 10, and an output shaft rotational speed sensor 86 for detecting the rotational speed $N_{OUT}$ of the output shaft 24 of the automatic transmission 10 (refer to FIG. 1), these sensors supplying to the ECU 90 signals representing the input shaft rotational speed $N_{IN}$ and the output shaft rotational speed $N_{OUT}$.

Figure 5:
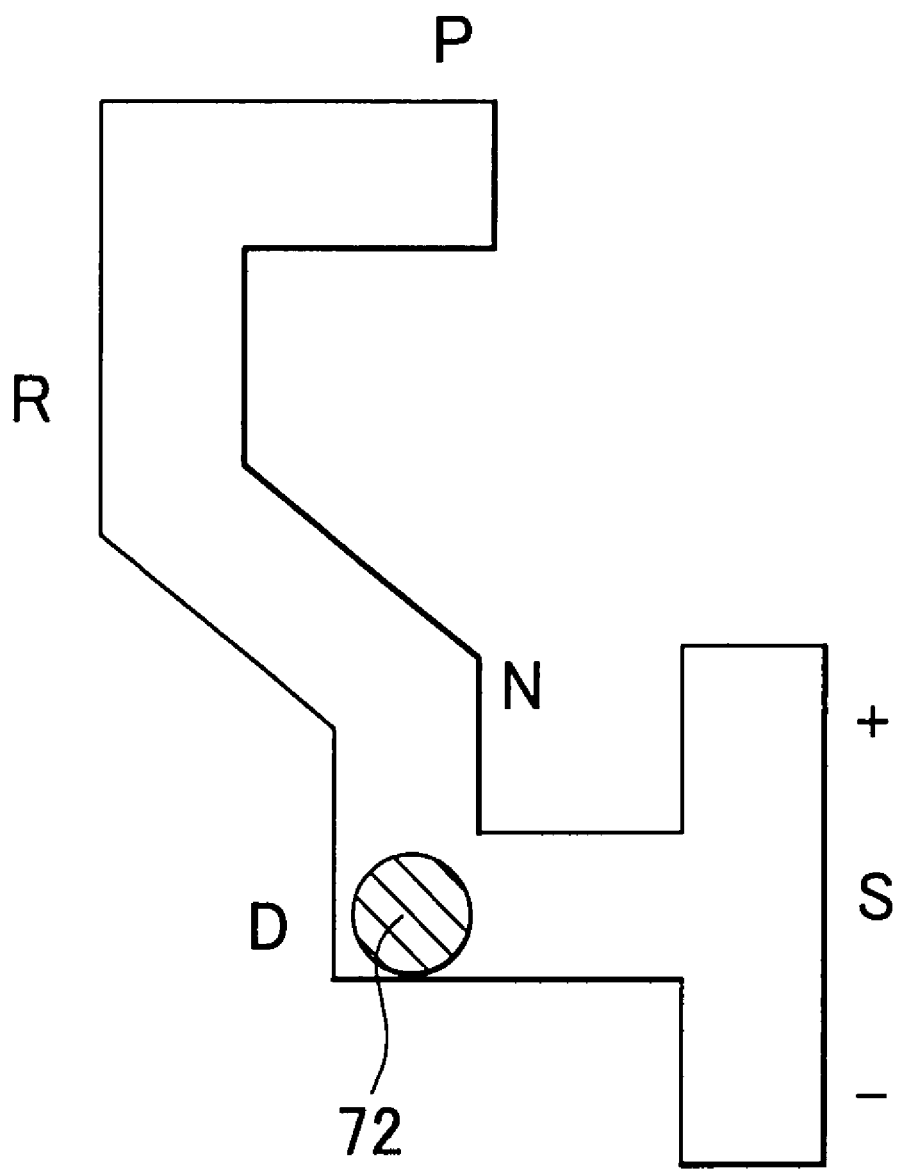
FIG. 5 is a drawing describing the operating positions of the shift lever shown in FIG 4.

The shift lever 72 is disposed, for example, in the vicinity of the seat of the driver and, as shown in FIG. 5, is manually operated to the five lever positions P, R, N, D, and S. The P position is a parking position, in which the power train within the automatic transmission 10 is disengaged and also in which a mechanical parking mechanism mechanically prevents rotation of (locks) the output shaft 24. The R position is a reverse driving position, in which the output shaft 24 of the automatic transmission 10 is rotated in the reverse direction. The N position is a neutral position, in which the drive is cut off to disengage the power train within the automatic transmission 10. The D position is a forward driving position, in which the automatic gear shifting control is performed over the allowable gear shifting range (D range) from the first gear (1st) to the eighth gear (8th) of the automatic transmission 10. The S position is a forward drive position in which manual gear shifting is possible between a plurality of different top gears of the gear shifting ranges or between a plurality of different gears.

The S position includes a "+" position for shifting up the gear shift range or gear each time the shift lever 72 is operated, and a "−" position for shifting down the gear shift range or gear each time the shift lever 72 is operated. The lever position sensor 74 detects at what lever position (operating position) $P_{SH}$ the shift lever 72 is set.

The hydraulic control circuit 98 has, for example, a manual valve which is not shown linked to the shift lever 72 via a cable or link which is not shown, the manual valve being mechanically operated by the shift lever 72 to switch the hydraulic circuit within the hydraulic control circuit 98. For example, in the D position and the S position, the forward hydraulic pressure $P_D$ is output to mechanically establish the forward driving circuit, wherein it is possible to drive forward while shifting gears between the first (1st) to the eighth (8th) gears which are the forward gears. When the shift lever 72 is in the D position, the ECU 90 determines that condition by the signal from the lever position sensor 74 and establishes the automatic shifting mode, in which gear shifting control is performed using all of the forward gears from the first (1st) to the eighth (8th).

Figure 6:
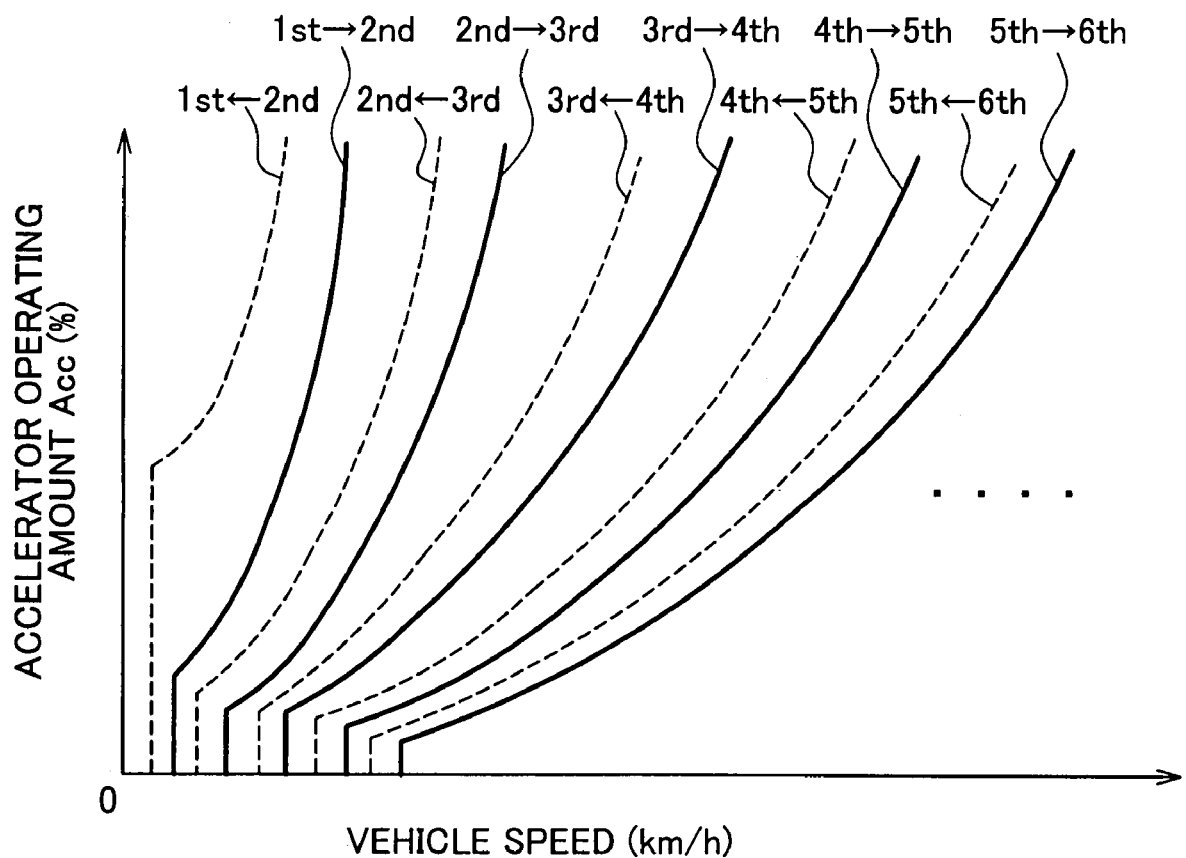
FIG. 6 is a graph showing an example of a gear shift graph used in gear shift control by the electronic control unit shown in FIG. 4.

The ECU 90 determines the gear shift based on the actual vehicle speed V and the accelerator operating amount Acc from a relationship stored beforehand (in a map or gearing shifting graph), such as in FIG. 6, with the vehicle speed V and the accelerator operating amount Acc as parameters.

In order to establish the determined gear, the excitation/non-excitation or current control of linear solenoid valves SL1 to SL6 within the hydraulic control circuit 98 used for gear shifting is performed, that switches the engaged and disengaged conditions of the clutches C and the brakes B, and controls the transient hydraulic pressure during the gear shifting process. That is, excitation/non-excitation of the linear solenoid valves SL1 to SL6 are each controlled to switch the engaged and disengaged conditions of the clutches C and the brakes B, thereby establishing one of the forward gears in the range from the first gear (1st) to the eighth gear (8th). Various modes are possible, for example performing gear shift control based on the throttle opening $\theta_{TH}$, the intake air amount Q, or the road surface inclination.

In the gear shift graph of FIG. 6, the solid lines are gear shift lines for determining upshifts (upshift lines), and the broken lines are gear shift lines for determining downshifts (downshift lines). The gear shift lines in the gear shift graph of FIG. 6 are for the purpose of determining whether on the horizontal line representing the actual accelerator operation amount Acc (%) the actual vehicle speed V laterally crosses the lines, that is, whether the actual vehicle speed V has exceeded value $V_S$ (vehicle speed at gear shiftings) at which the gear shift on the gear shift line should be executed. These lines are stored as a collection of the values $V_S$, in the ECU 90 beforehand. The gear shift lines in FIG. 6 are shown as examples of the gear shift lines for the first (1st) to the sixth (6th) gears of the first (1st) to the eighth (8th) gears which are shifted in the automatic transmission 10.

Figure 7:
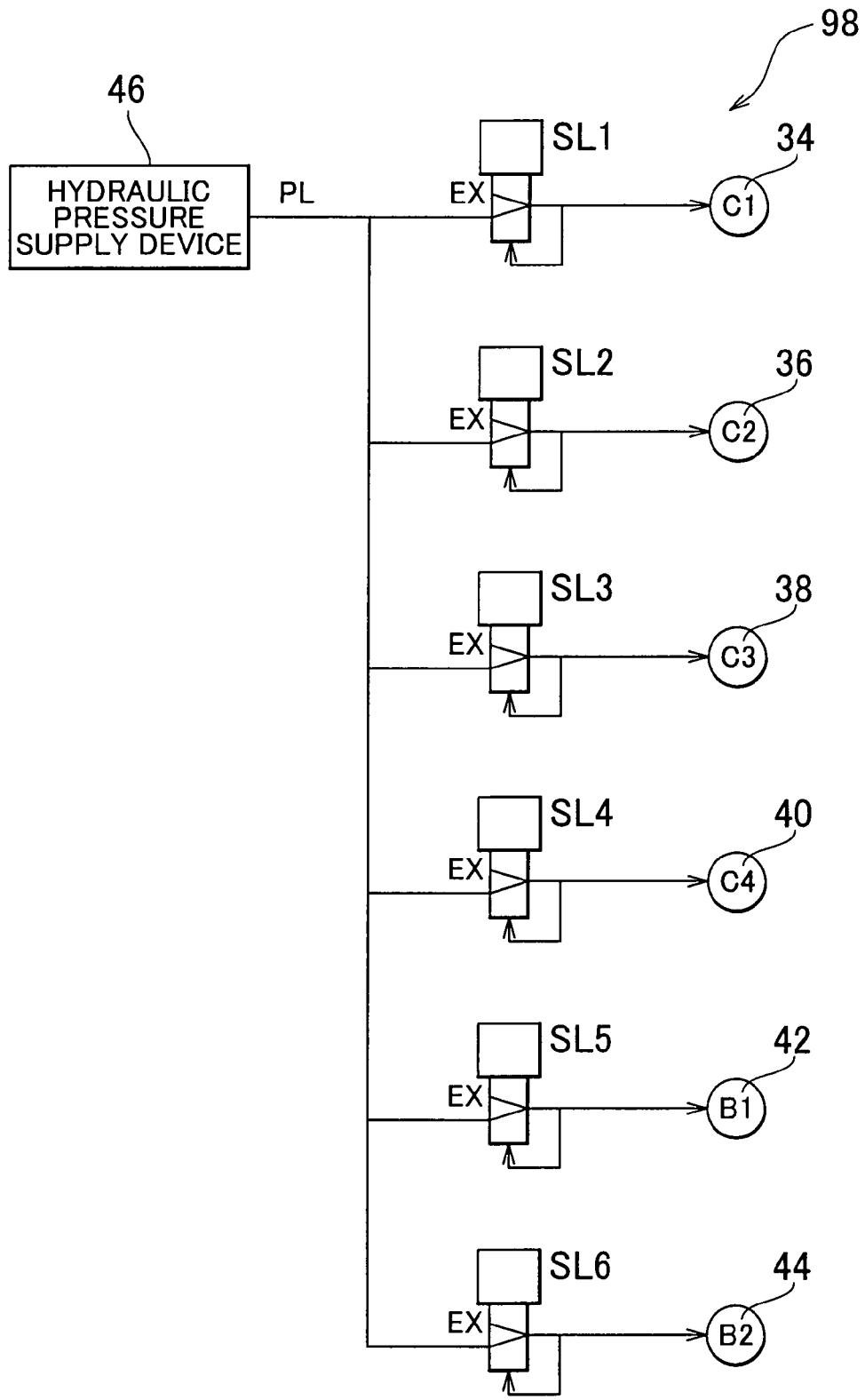
FIG. 7 is a drawing describing the main part of the hydraulic control circuit shown in FIG. 4.

FIG. 7 is a circuit diagram showing the part of the hydraulic control circuit 98 associated with the linear solenoid valves SL1 to SL6. In this drawing, hydraulic actuators (hydraulic cylinders) 34, 36, 38, 40, 42, and 44 of the clutches C and the brakes B are each supplied pressure from the line hydraulic pressure $P_L$ output from the hydraulic pressure supply device 46, which is adjusted by the linear solenoid valves SL1 to SL6.

The hydraulic pressure supply device 46 includes a mechanical oil pump 48 (refer to FIG. 1) that is rotationally driven by the engine 30 and a regulator valve or the like that adjusts the pressure of the line hydraulic pressure $P_L$, and controls the line hydraulic pressure $P_L$ in response to, for example, the engine load. The linear solenoid valves SL1 to SL6 are basically all of the same structure, and are independently excited or non-excited by the ECU 90 (refer to FIG. 4), the hydraulic pressure of each of the hydraulic actuators 34 to 44 being independently pressure-adjusted.

In the gear shift control of the automatic transmission 10, so-called clutch-to-clutch gear shifting is, for example, performed, in which the engaging and disengagement of clutches C and brakes B involved in the gear shift are executed at the same time. For example, as shown in the engagement operation diagram of FIG. 2, in a downshift from the fifth gear (5th) to the fourth gear (4th), clutch C2 is disengaged and clutch C4 is engaged and, to suppress gear shift shock, the transient disengagement hydraulic pressure of the clutch C2 and the transient engaging hydraulic pressure of the clutch C4 are appropriately controlled.

Figure 8:
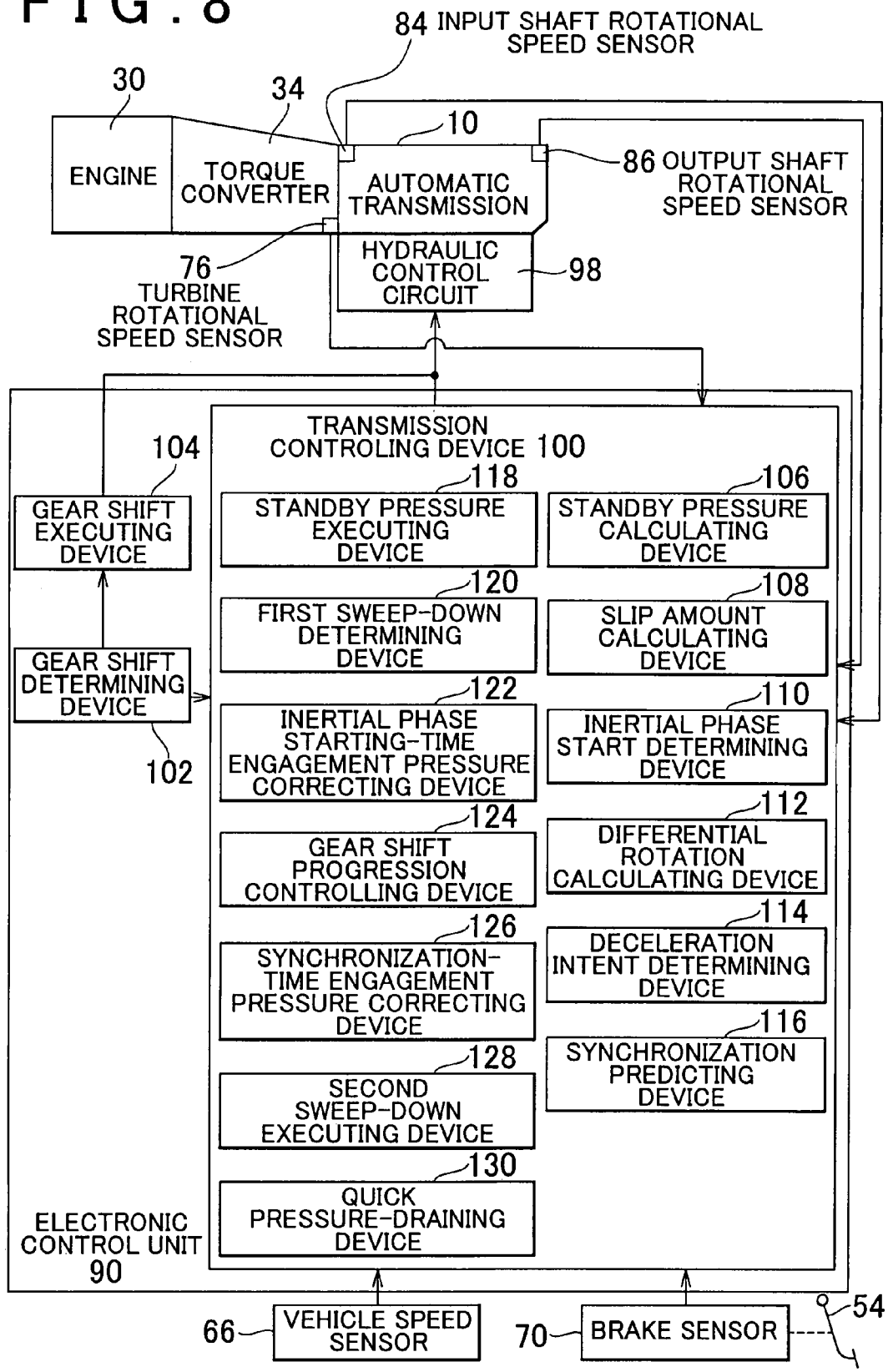
FIG. 8 is a functional block diagram describing the control operation of the main part of the control function of the electronic control unit shown in FIG. 4, that is, the control operation when a disengaged-side engaging element is disengaged and also a one-way clutch is engaged from the disengaged condition.

FIG. 8 is a functional block diagram describing the main part of the control operation in the ECU 90. Specifically, FIG. 8 describes the control operation when, during deceleration CR of the vehicle, a gear shift is performed by disengagement of a disengaged-side engaging element and also engaging the one-way clutch from the disengaged condition. The ECU 90 shown in FIG. 8 includes mainly a transmission controlling device 100, a gear shift determining device 102, and a gear shift executing device 104.

The transmission controlling device 100, in the case in which the gear shift determined by the gear shift determining device 102 is a gear shift that includes an operation of engaging a one-way clutch required for the gear shift from the disengaged condition, executes the gear shift in place of the gear shift executing device 104.

The gear shift determining device 102, for example, based on the vehicle speed V or accelerator operation amount Acc, refers to the gear shifting graph such as shown in FIG. 6 while determining whether to perform a gear shift. The transmission controlling device 100 establishes a gear that has a large gear ratio on the low-speed according to the determination made by the gear shift determining device 102.

In the case in which the gear shift determining device 102 determines that a gear shift is to be executed, the gear shift executing device 104 determines which engaging elements required for a gear shift are to be disengaged and engaged, based on an engagement operation table such as that of FIG. 2, and, via the hydraulic pressure supply device 46, adjusts the hydraulic pressure supplied to the engaging elements that is to be disengaged and engaged.

In this embodiment, the automatic transmission 10 has a one-way clutch F1 and, as shown in the engagement operation table of FIG. 2, a first gear (1st) that is established by the one-way clutch F1 engaging. Therefore, a downshift to the first gear (1st) from any gear of the second (2nd) to eighth (8th) gears corresponds to a gear shift that includes an operation of engaging the one-way clutch F1 from the disengaged condition. Although the description that follows uses the example of a coast-down shift from the second gear (2nd) to the first gear (1st), the description applies in the same manner to a shift to the first gear (1st) from any gear of the third gear (3rd) to the eighth gear (8th).

The transmission controlling device 100 includes a standby pressure calculating device 106, a slip amount calculating device 108, an inertial-phase start determining device 110, a differential rotation calculating device 112, a deceleration intent determining device 114, a synchronization predicting device 116, a standby pressure executing device 118, a first sweep-down executing device 120, an inertial-phase starting-time engagement pressure correcting device 122, a gear shift progression controlling device 124, a synchronization-time engagement pressure correcting device 126, a second sweep-down executing device 128, and a quick pressure-draining device 130.

The standby pressure calculating device 106 calculates the standby pressure $P_{B1W}$ of the engagement pressure of the brake B1, which is the engaging element that is disengaged when a gear shift is performed. That is, the engagement pressure $P_{B1}$ of the brake B1 is reduced to disengage the brake B1, and the engagement pressure is reduced by the standby pressure executing device 118 to the above-noted standby pressure $P_{B1W}$ from the engagement pressure in the engaged condition beforehand. When this is done, it is desirable that the standby pressure $P_{B1W}$ be made as low an engagement pressure as possible as long as the disengagement of the B1 does not start, that is, as long as the brake B1 does not start to slip. Therefore, the standby pressure $P_{B1W}$ is calculated in response to various running conditions of the vehicle.

Specifically, the standby pressure $P_{B1W}$ is calculated, as the example bellow, based on the vehicle speed V detected by the vehicle speed sensor 66 and on the slip amount $N_{Tslip}$ of the torque converter calculated by the slip amount calculating device 108. The experimentally obtained relationship between the vehicle speed V, the slip amount $N_{Tslip}$, and the standby pressure $P_{B1W}$ is provided in the standby pressure calculating device 106 beforehand as a map with the vehicle speed V and the slip amount $N_{Tslip}$ as axes, and the standby pressure $P_{B1W}$ of the brake B1 corresponding to the actual vehicle speed V and slip amount $N_{Tslip}$ is calculated from the map. When doing this, because the brake B1 starts to slip at a higher engagement pressure, the input torque becomes larger with respect to the automatic transmission 10, the standby pressure $P_{B1W}$ is made accordingly larger. Therefore, the lower is the vehicle speed V and the larger is the slip amount $N_{Tslip}$, the larger is the standby pressure $P_{B1W}$.

The slip amount calculating device 108 calculates the slip amount $N_{Tslip}$, which is the difference between the turbine rotational speed $N_T$ of the torque converter 32 and the rotational speed $N_E$ of the engine 30. When doing this, the turbine rotational speed $N_T$ is detected, for example, by the turbine rotational speed sensor 76, and the engine rotational speed $N_E$ is detected, for example, by the engine rotational speed sensor 58.

The standby pressure executing device 118 is executed first when the transmission controlling device 100 is executed. Before the engagement pressure $P_{B1}$ of the brake B1, which is the engaging element to be engaged in a gear shift of the automatic transmission 10, is reduced to the engagement pressure for actual disengagement, it is reduced to the standby pressure $P_{B1W}$ calculated by the standby pressure calculating device 106. When doing this, in order to improve the tracking of the engagement pressure $P_{B1}$ in consideration of the delay in the hydraulic pressure response, and in order to quickly reduce the engagement pressure $P_{B1}$ of the brake B1 to the standby pressure $P_{B1W}$, the standby pressure executing device 118 may perform a execution of a quick-drain control, which gives an instruction for an engagement pressure of the disengaged-side engaging element that is lower than the standby pressure $P_{B1W}$ is given for a prescribed period of time.

The first sweep-down executing device 120 causes a continuous reduction (sweep-down) of the engagement pressure $P_{B1}$ of the brake B1 which was placed in the standby condition by the standby pressure executing device 118, and starts the torque phase of the gear shift. The first sweep-down executing device 120, for example, performs a sweep down when a pre-established amount of time has elapsed after the standby pressure executing device 118 places the brake B1 into the standby condition.

The inertial-phase start determining device 110 determines whether the inertial phase in the gear shift from the second gear (2nd) to the first gear (1st) has started. Specifically, at the point in time at which the turbine rotational speed $N_T$ of the torque converter 32 begins to increase from the synchronization rotational speed in the gear before the gear shift (second gear (2nd)), the inertial-phase determining device 110 makes the determination that the slippage of the brake B1, which is the engaging element to be disengaged by the gear shift, has been detected, and that the inertial phase has started. In this case, the synchronization rotational speed in the gear before the gear shift is the rotational speed $N_{OUT}$ of the output shaft 24 of the automatic transmission 10 multiplied by the gear ratio γ2 of the second gear (2nd), which is the gear before the gear shift.

In the case in which the start of the inertial phase is determined by the inertial-phase start determining device 110, the inertial-phase starting-time engagement pressure correcting device 122 increases the engagement pressure $P_{B1}$ of the brake B1, which is the engaging element to be disengaged by the gear shift, by an amount of second prescribed amount of α2, for example, by a single step in a stepwise manner. The second prescribed amount α2 is an amount that is pre-established experimentally, for example, an experimentally calculated value to prevent the progression of the gear shift because the engagement pressure has decreased excessively because of the hydraulic pressure delay, or to soften the gear shifting shock of the vehicle caused by a sudden change of the engagement pressure $P_{B1}$.

The differential rotation calculating device 112 calculates the differential rotation $N_{Tdiff}$, which is the difference between the synchronization rotational speed in the gear after the gear shift (first gear (1st)) and the actual turbine rotational speed $N_T$ of the torque converter 32. The synchronization rotational speed in the gear after the gear shift is the rotational speed $N_{OUT}$ of the output shaft 24 of the automatic transmission 10 multiplied by the gear ratio γ1 of the first gear (1st), which is the gear after the gear shift.

The gear shift progression controlling device 124 adjusts the engagement pressure $P_{B1}$ of the brake B1, which is the engaging element to be disengaged in the gear shift, so that the gear shift does not stop or retreat, based on the differential rotation $N_{Tdiff}$ calculated by the differential rotation calculating device 112, and $dN_{Tdiff}/dt$, which is the amount of change in the differential rotation $N_{Tdiff}$ in a considerably small unit of time. Specifically, for example, a map for calculating the engagement pressure $P_{B1}$ of the brake B1 from the differential rotation $N_{Tdiff}$ and the change amount $dN_{Tdiff}/dt$ of the differential rotation is prepared beforehand in the shift progression controlling device 124, and a value calculated in response to the actual differential rotation $N_{Tdiff}$ and the change amount $dN_{Tdiff}/dt$ of the differential rotation is taken as the engagement pressure of the brake B1 from the map.

The gear shift progression controlling device 124, in the case in which the progress of the gear shift was stopped in accordance with the inertial-phase starting-time engagement pressure correcting device 122, causes progression of the gear shift again. That is, when the differential rotation change amount $dN_{Tdiff}/dt$ of the differential rotation is increasing, the gear shift progression controlling device 124 decreases the engagement pressure $P_{B1}$ of the brake B1. In contrast, if the change amount $dN_{Tdiff}/dt$ of the differential rotation is decreasing, the gear shift progression controlling device 124 either increases or leaves as is the engagement pressure $P_{B1}$ of the brake B1. At minimum the gear shift progression controlling device 124 should avoid a condition in which the gear shift does not proceed.

The deceleration intent determining device 114, for example, detects whether an operation of the brake pedal 54 has been made by the driver, to determine by the brake sensor 70 whether the driver intends to decelerate.

The synchronization prediction device 116, for example, predicts the time required for completion of synchronization to the gear after the gear shift is performed. Specifically, the synchronization prediction device 116 predicts the amount of time required for the turbine rotational speed $N_T$ of the torque converter 32 to reach a prescribed rotational speed, which is slightly lower than the synchronization rotational speed in the gear after the gear shift (first gear (1st)), based on, for example, the degree of deceleration, which represents the running condition of the vehicle at the time of the prediction.

The synchronization-time engagement pressure correcting device 126, in the case in which the deceleration intent determining device 114 determines that there is an intent by the driver to decelerate, increases the engagement pressure $P_{B1}$ of the brake B1, which is an engaging element to be disengaged by the gear shift, by an amount of a first prescribed amount α1, by, for example, by a single step in a stepwise manner (refer to FIG. 14), at the synchronization determination time predicted by the synchronization predicting device 116. At that time, the first prescribed amount α1 is established, for example, based on the deceleration CR of the vehicle and the amount of change $dN_T/dt$ of turbine rotational speed $N_T$, to synchronize the one-way clutch F1 during the decrease of the turbine rotational speed $N_T$ after increasing the turbine rotational speed $N_T$ during the decrease of the turbine rotational speed $N_T$.

Specifically, for example, a map for calculating the first prescribed amount α1, which is the correction amount of the engagement pressure $P_{B1}$ of the brake B1, from the deceleration CR and from the amount of change $dN_T/dt$ of the turbine rotational speed is prepared beforehand in the synchronization-time engagement pressure correcting device 126, and the value calculated from the map in response to the actual deceleration CR and change amount $dN_{Tdiff}/dt$ of the turbine rotational speed is taken as the engagement pressure correction amount α1 for the brake B1. In this case, the deceleration CR is an index that represents the degree of deceleration of the vehicle, for example $dN_{OUT}/dt$, which is the amount of change in the rotational speed $N_{OUT}$ of the output shaft 24 of the automatic transmission 10 in a considerably small unit of time, or dV/dt, which is the amount of change of the vehicle speed V in a considerably small unit of time.

Figure 9:
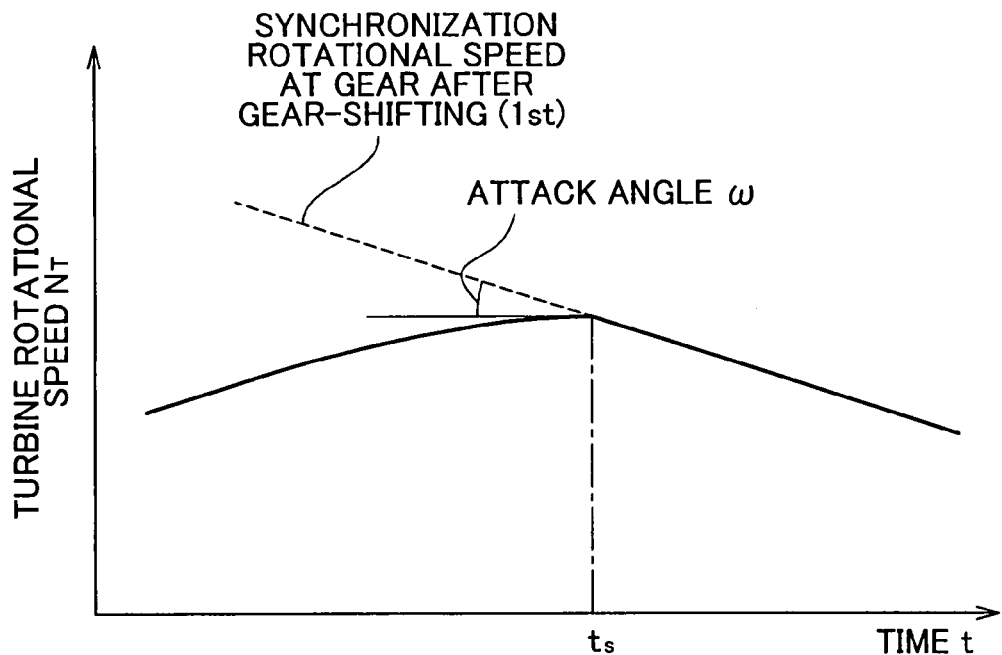
FIG. 9 is a graph showing the manner in which the rotational speed of the turbine changes before and after the completion of synchronization in a gear shift.

FIG. 9 is a drawing showing the manner in which the rotational speed $N_T$ of the turbine changes before and after the completion of synchronization to the gear after the gear shift. In FIG. 9, the solid line represents the turbine rotational speed $N_T$, and the broken line represents the synchronization rotational speed at the gear after the gear shift (first gear (1st)). At time $t_s$ in the drawing, the turbine rotational speed $N_T$ coincides with the synchronization rotational speed of the gear after the gear shift (first gear (1st)). That is, the inertial phase, in which the turbine rotational speed $N_T$ changes, is completed, and synchronization is completed.

In FIG. 9, when the curve representing the turbine rotational speed $N_T$ during the inertial phase (at time $t<t_s$) strikes the straight line representing the synchronization rotational speed of the gear after the gear shift (first gear (1st)) at time $t_s$, the smaller the attack angle ω, that is, the smaller is the angle formed between the line tangent to the curve representing the turbine rotational speed $N_T$ at the time $t_s$ and the straight line representing the synchronization rotational speed of the gear after the gear shift (first gear (1st)), the smaller is the gear shifting shock accompanying the engagement of the one-way clutch F1 at the time of synchronization. Given this, an attempt is made to reduce the attack angle by reducing the amount of change of the turbine rotational speed $N_T$. From this standpoint, in the synchronization-time engagement pressure correcting device 126, the larger is the deceleration CR before synchronization, and the larger is the amount of change $dN_T/dt$ of the turbine rotational speed immediately before synchronization, the larger is the correction amount α1 for the engagement pressure of the brake B1 is made.

Returning to FIG. 8, the second sweep-down executing device 128, in response to the condition of the vehicle, performs any one of three types of control described below, to continuously decrease (sweep down) the engagement pressure $P_{B1}$ of the brake B1, which is the engaging element to be disengaged by a gear shift.

The first control is executed in the case in which the second control and the third control described below are not performed, and after completion of synchronization to the gear after the gear shift, the second sweep-down executing device 128 continuously reduces the engagement pressure $P_{B1}$ of the brake B1, which is the engaging element disengaged by the gear shift. By doing this, by the first control the second sweep-down executing device 128 places the brake B1 in the completely disengaged condition.

The second control is executed in the case in which the intent of the driver to decelerate is no longer determined by the deceleration intent determining device 114 after the execution of increase correction of the engagement pressure $P_{B1}$ of the brake B1 by the synchronization-time engagement pressure correcting device 126 and in which the third control described below, is not executed. In the second control, in the case in which the intent by the driver to decelerate is no longer determined, the second sweep-down executing device 128 continuously decreases the engagement pressure $P_{B1}$ of the brake B1, without waiting for the end of the inertial phase. By doing this, delay in the progression of the gear shift by excessive torque capacity of the disengagement-side engaging element is prevented, as is the occurrence of delayed gear shifting shock.

The third control is executed after execution of increase correction of the engagement pressure $P_{B1}$ of the B1 by the synchronization-time engagement pressure correcting device 126, in the case in which the intent of the driver to decelerate is no longer determined by the deceleration intent determining device 114 and if, after execution of increase correction of the engagement pressure $P_{B1}$ of the brake B1 by the synchronization-time engagement pressure correcting device 126, a pre-established amount of time has not yet elapsed. In the case in which the intent by the driver to decelerate is no longer determined, the second sweep-down execution device 128 decreases the engagement pressure $P_{B1}$ of the brake B1 continuously by the third control from the engagement pressure $P_{B1}$ of the brake B1 before the increase correction by the synchronization-time engagement pressure correcting device 126, without waiting for the completion of the inertial phase.

The pre-established amount of time is the amount of time required, after the increase correction of the engagement pressure by the synchronization-time engagement pressure correcting device 126 is reflected in the hydraulic pressure command value for the hydraulic pressure to rise, for the torque capacity of the brake B1, which is the disengagement-side engaging element to begin to rise, this being a value that is experimentally determined beforehand. That is, if this time has not yet elapsed, the torque capacity of the brake B1, which is the disengagement-side engaging element, has not substantially risen, and by continuously decreasing the engagement pressure $P_{B1}$ Of the brake B1 from the engagement pressure $P_{B1}$ of the brake B1 before the increase correction of the engagement pressure by the synchronization-time engagement pressure correcting device 126, it is possible to perform a gear shift that takes into account the inherent hydraulic pressure delay.

Figure 10:
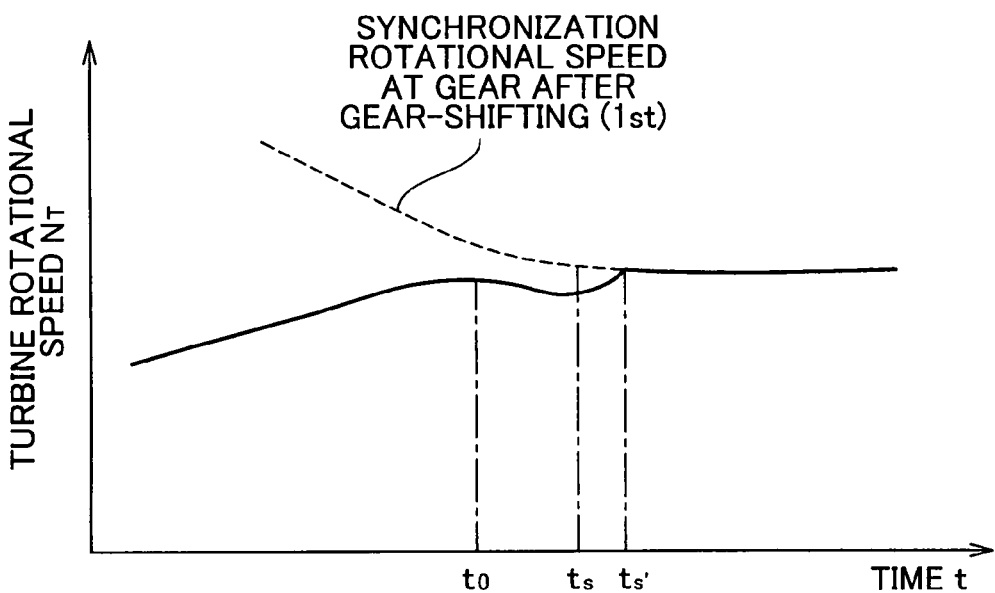
FIG. 10 is a graph showing the manner in which the rotational speed of the turbine and the gear synchronization rotational speed after the gear shift change in the case in which, during a gear shift, the driver no longer intends to make a gear shift.

FIG. 10 is a drawing showing the manner in which the turbine rotational speed $N_T$ of the torque converter 32 changes in the case in which the second sweep-down executing device 128 continuously decreases the engagement pressure $P_{B1}$ of the brake B1 by the second control. In FIG. 10, the solid line represents the turbine rotational speed $N_T$, and the broken line represents the synchronization rotational speed at the gear after the gear shift (first gear (1st)).

At a point in time in FIG. 10 before the time $t_0$, the synchronization predicting device 116 predicts that synchronization will occur at the time $t_s$, and the engagement pressure $P_{B1}$ of the brake B1 is increasing corrected by the synchronization-time engagement pressure correcting device 126. In the case in which the deceleration intent determining device 114 no longer determines that the driver intends to decelerate at time $t_0$, the decrease of the synchronization rotational speed of the gear after the gear shift (first gear (1st)), by, for example, by the release of the brake pedal 54, becomes gradual. Because the increase correction of the engagement pressure $P_{B1}$ of the brake B1 by the synchronization-time engagement pressure correcting device 126 has already been made, the rise of the turbine rotational speed $N_T$ also becomes gradual. For this reason, it is possible that the inertial phase does not end, or that gear shift reverses to the gear before the gear shift. Given this, in order to achieve progression in the gear shift, the second control causes the second sweep-down executing device 128 to decrease the engagement pressure $P_{B1}$ of the brake B1, and to complete the synchronization at the time $t_s'$.

Figure 11:
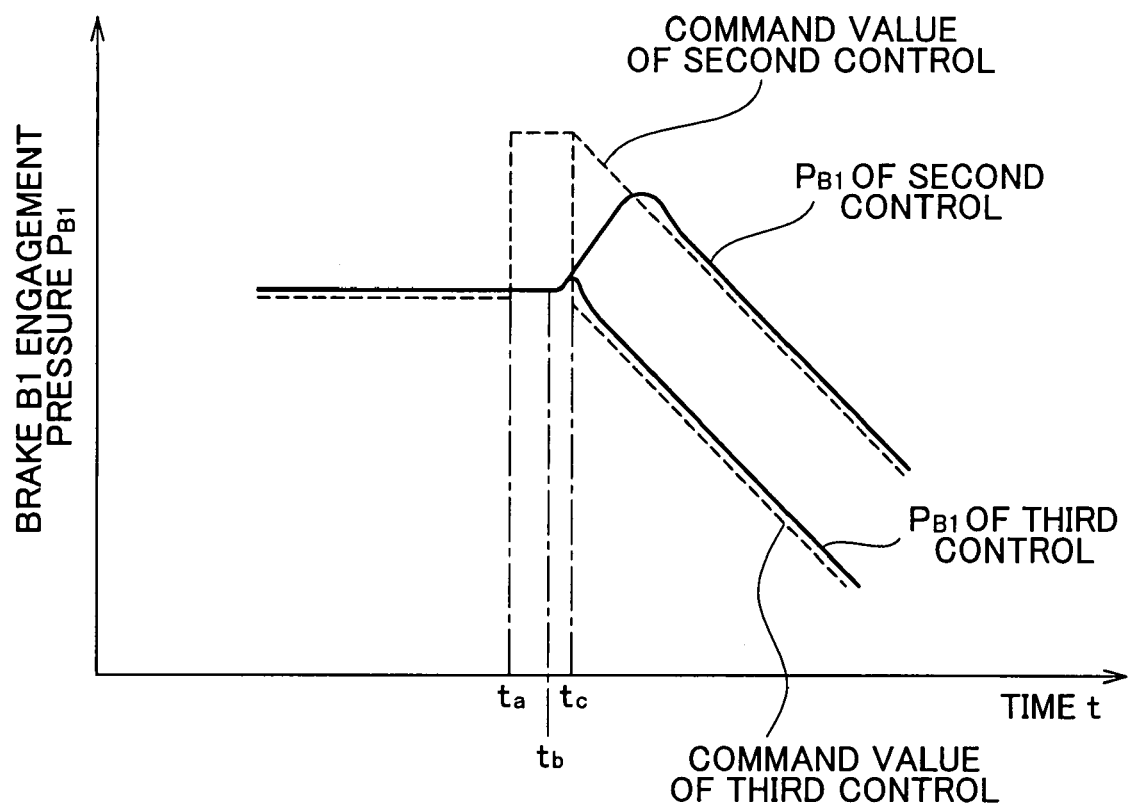
FIG. 11 is a graph showing the engagement pressure command value executed by a second sweep-down executing device when the driver no longer intends to make a gear shift during a gear shift, immediately after an increase correction of the engagement pressure by a synchronization-time engagement pressure correcting device.

FIG. 11 shows the case in which the engagement pressure $P_{B1}$ of the brake B1 is continuously decreased by the third control, that is, the case in which, after execution of increase correction of the engagement pressure $P_{B1}$ of the brake B1 by the synchronization-time engagement pressure correcting device 126, the intent of the driver to decelerate is no longer determined by the deceleration intent determining device 114, and the fact that there is no longer an intent to decelerate is in the case of being within a pre-established time after the execution of increase correction of the engagement pressure $P_{B1}$ of the brake B1 by the synchronization-time engagement pressure correcting device 126. FIG. 11 shows the command value of the engagement pressure $P_{B1}$ and the actual amount of change when the engagement pressure $P_{B1}$ of the brake B1 continuously decreased by the third control in that case are compared with the engagement pressure $P_{B1}$ of the brake B1 continuously decreased by the second control in the same case.

As shown in FIG. 11, while the increase correction of the engagement pressure $P_{B1}$ of brake B1 by the synchronization-time engagement pressure correcting device 126 is reflected at time $t_a$, the actual start of the rise of the engagement pressure based on that command value is at time $t_b$. When the intent of the driver to decelerate is no longer determined by the deceleration intent determining device 114, that is, at time $t_c$, at which it is determined that the driver no longer intends to decelerate, the engagement pressure $P_{B1}$ of the brake B1 has not risen sufficiently to substantially increase the torque capacity of the brake B1.

In the above-noted condition, when a command is give to perform a continuous decrease from the engagement pressure after the increase correction, such as in the second control, the actual engagement pressure $P_{B1}$ of the brake B1, because of the influence of the delay in the hydraulic pressure of the actual engagement pressure $P_{B1}$ of the brake B1, after some increase, decreases. In contrast, if a command is given to perform a continuous decrease from the engagement pressure before the increase correction, such as in the third control, the actual engagement pressure $P_{B1}$ of the brake B1 begins to decrease without rising hardly at all. The same is true if the time $t_c$ at which the intent to decelerate is no longer determined is before the time $t_b$ at which the engagement pressure begins to rise.

Returning to FIG. 8, during the execution of a gear shift, if the vehicle speed V is lower equal to or lower than a pre-established prescribed value, the quick pressure-draining device 130 more quickly decreases the engagement pressure $P_{B1}$ of the brake B1, which is the engaging element to be disengaged by the gear shift. By doing this, when the brake B1 is engaged, this is to prevent the so-called hill-hold phenomenon, in which the brake B1 hinders the rotation of the second rotating element RM2 so that the vehicle cannot move in reverse, such as when the vehicle is attempting to move in reverse on an upgrade.

When the hill-hold phenomenon occurs, all of the force of the vehicle attempting to move in reverse on an upgrade is born by the brake B1, which is undesirable from the standpoint of, for example, the endurance of the brake B1. Therefore, in the case in which the vehicle speed V decreases to no greater than a pre-established prescribed value in the condition immediately before the occurrence of the hill-hold phenomenon, quickly decreasing the engagement pressure of the brake B1, the brake B1 is placed in the completely disengaged condition and is caused to slip.

In this embodiment, the transmission controlling device 100 performs a gear shift from the second gear (2nd) to the first gear (1st), and while the brake B1 is disengaged in the first gear (1st), during the gear shift to the first gear (1st) and even after synchronization to the first gear (1st), before the decrease of the engagement pressure $P_{B1}$ of the brake B1 by the second down-sweep executing device 128 is complete, the brake B1 is not in the completely disengaged condition. For this reason, the above-noted hill-hold phenomenon may occur.

When doing this, more quickly reducing the engagement pressure $P_{B1}$ of the brake B1 is, for example, reducing the engagement pressure more quickly than the reducing of the $P_{B1}$ of the brake B1 by the second sweep-down executing device 128. Specifically, more quickly reducing the engagement pressure is, for example, making a setting with respect to the solenoid valve SL5 (refer to FIG. 7) for the engagement pressure $P_{B1}$ of the brake B1 to cause a faster reduction than the reduction of the engagement pressure $P_{B1}$ of the brake B1 by the second sweep-down executing device 128, or instructing to output a pressure that is lower than the piston stroke end pressure.

Figure 12A:
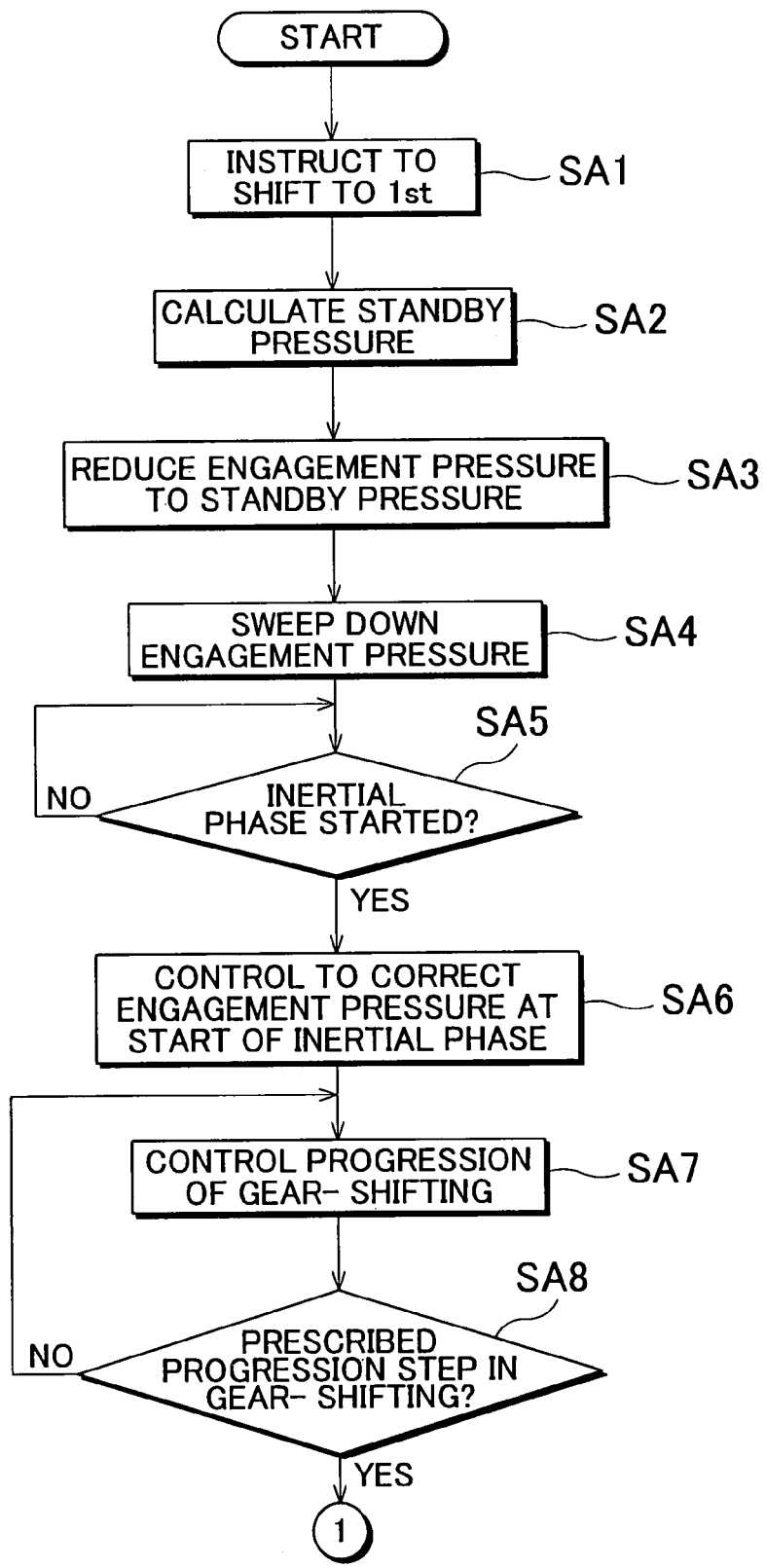
FIG. 12A and FIG. 12B show a flowchart of the main part of the downshift control by the electronic control unit shown in FIG. 4.
Figure 12B:
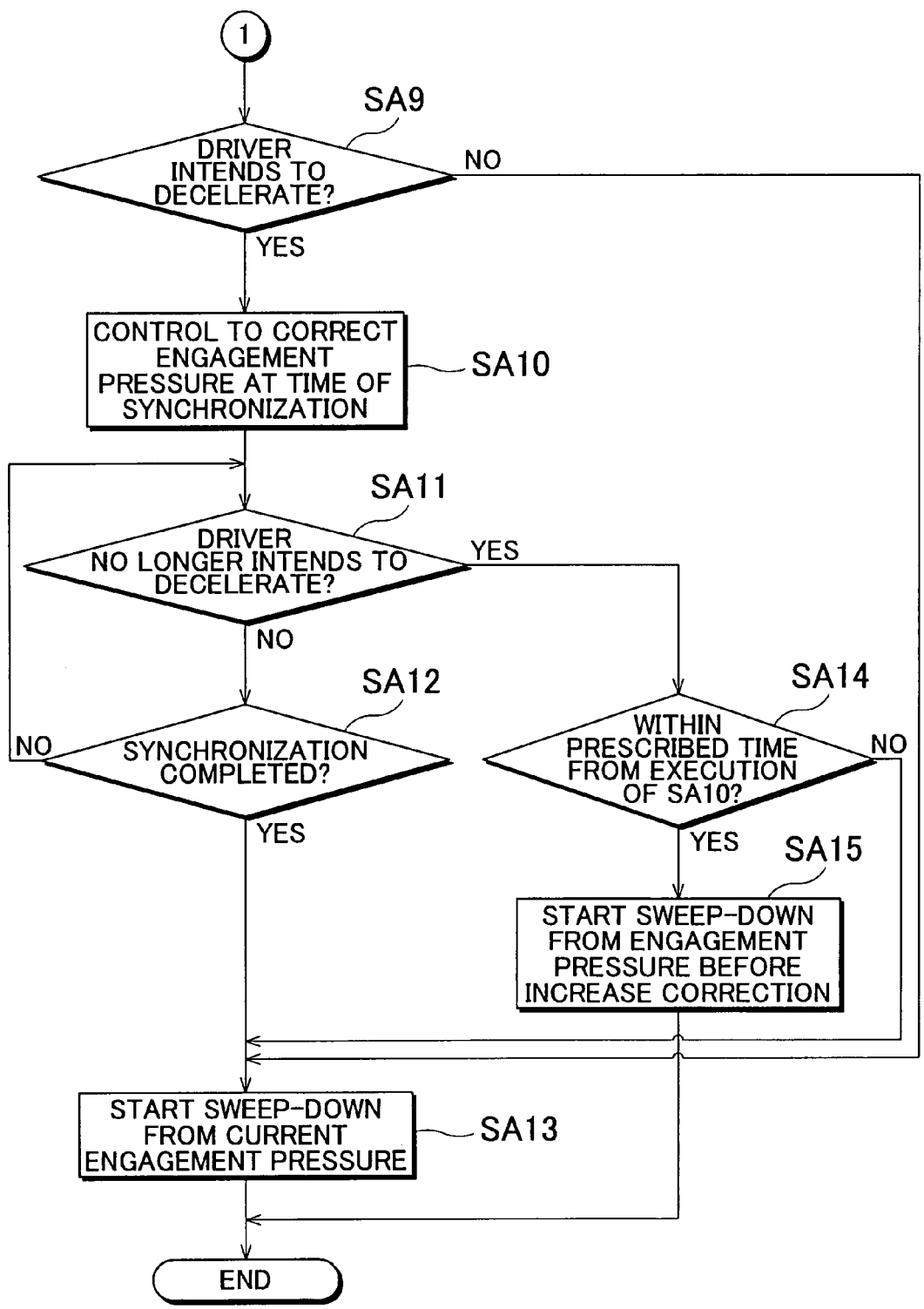

FIG. 12A and FIG. 12B describe a flowchart of the main part of coast-down gear shifting by the ECU 90. Step SA1 (the term "step" omitted hereinafter) corresponds to the gear shift determining device 102, and at SA1 the gear shift determining device 102 determines, from the gear shifting graph of FIG. 6, whether to execute a gear shift, based for example on the vehicle speed V and the accelerator operating amount Acc. In the case of making a gear shift to the first gear (1st) from any gear from the second (2nd) to eighth gears (8th), which includes an operation of disengaging an engaging element from the engaged condition and also engaging the one-way clutch F1 from the disengaged condition, the transmission controlling device 100 performs a gear shift.

At SA2, which corresponds to the slip amount calculating device 108 and the standby pressure calculating device 106, the slip amount calculating device 108 calculates the amount of slip $N_{Tslip}$ of the torque converter and, from the calculated amount of slip $N_{Tslip}$ and the vehicle speed V, the standby pressure calculating device 106 calculates the standby pressure $P_{B1W}$ that is the engagement pressure in the standby condition of the brake B1, which is the engaging element to be disengaged, based on a map prepared beforehand.

At SA3, which corresponds to the standby pressure executing device 118, the standby pressure executing device 118 decreases the engagement pressure $P_{B1}$ of the brake B1 to the standby pressure $P_{B1W}$ calculated at SA2 to place the brake B1 in the standby condition. When this is done, the standby pressure executing device 118, taking into consideration the hydraulic pressure delay, may perform so-called quick-drain control to improve the tracking of the hydraulic pressure, that is, to quickly reduce the engagement pressure $P_{B1}$ of the brake B1 to the standby pressure $P_{B1W}$, by issuing an instruction for a prescribed amount of time for engagement pressure that is lower than the standby pressure $P_{B1W}$.

At SA4, which corresponds to the first sweep-down executing device 120, the first sweep-down executing device 120 continuously decreases the engagement pressure $P_{B1}$ of the brake B1, which was place in the standby condition at SA3. By doing this, the toque phase of the gear shift begins. The execution of SA4 is made, for example, when a pre-established prescribed amount of time elapses after the start of the standby condition of the brake B1 by SA3.

At SA5, which corresponds to the inertial-phase start determining device 110, the inertial-phase start determining device 110 makes a determination of whether the inertial phase of the gear shift can be started, for example, by the start of the increase of the rotational speed $N_T$ of the turbine of the torque converter 32 from the synchronization rotational speed in the gear before the gear shift (second gear in this embodiment). If the result of the determination is affirmative, the next step SA6 is executed, and if the result of the determination is negative, this step is repeated to wait until the inertial step is started.

At SA6, which corresponds to the inertial-phase starting-time engagement pressure correcting device 122, the inertial-phase starting-time engagement pressure correcting device 122 increases the engagement pressure $P_{B1}$ of the brake B1, in the case in which a determination is made at SA5 of the start of the inertial phase, by a second prescribed amount α2, for example, by a single step in a stepwise manner.

At SA7, which corresponds to the differential rotation calculating device 112 and the gear shift progression controlling device 124, the differential rotation calculating device 112 calculates the differential rotation $N_{Tdiff}$, which is the difference between synchronization rotational speed in the gear after the gear shift (first gear in this embodiment) and the actual turbine rotational speed $N_T$ of the torque converter 32. For example, the gear shift progression controlling device 124, based on a map prepared beforehand using the calculated differential rotation $N_{Tdiff}$ and $dN_{Tdiff}/dt$ which is the amount of change thereof in a considerably small unit of time, adjusts the engagement pressure $P_{B1}$ of the brake B1 to avoid a condition in which the gear shift does not proceed. When this is done, for example, because the differential rotation $N_{Tdiff}$ begins to decrease with the start of the inertial phase and, becomes zero with the achievement of synchronization after the gear shift, the differential rotation $N_{Tdiff}$ is used as the degree of the progression of the gear shift.

At SA8, a determination of whether the gear shift has progressed to a prescribed degree of progression is made. If the result of this determination is affirmative, the next step SA9 is executed, but if the result of the determination at SA8 is negative, SA7 is repeated until the gear shift reaches the pre-established prescribed degree of progression.

At SA9, which corresponds to the deceleration intent determining device 114, the deceleration intent determining device 114 determines whether the driver intends to decelerate, for example by whether or not the brake pedal 54 is detected by the brake sensor 70 as being depressed. If the result of the determination at this step is affirmative, the next step SA10 is executed. If the result of the determination at this step is negative, SA13, which is described below, is executed.

At SA10, which corresponds to the synchronization predicting device 116 and the synchronization-time engagement pressure correcting device 126, the synchronization predicting device 116 first predicts the time required for the completion of synchronization to the gear after the gear shift. Then, the synchronization-time engagement pressure correcting device 126 increases the engagement pressure $P_{B1}$ of the brake B1 by an amount of first prescribed amount α1, by, for example, a single step in a stepwise manner, at a time before the predicted synchronization time. When this is done, the first prescribed amount α1 is determined by, for example, the deceleration CR of the vehicle, and the change amount $dN_T/dt$ of the turbine rotational speed $N_T$.

At SA11, which corresponds to the deceleration intent determining device 114, the deceleration intent determining device 114 determines whether the driver no longer intends to decelerate. If the result of the determination of this step is negative, that is, in the case in which the driver continues to intend to decelerate, the next step SA12 is executed. However, if the result of the determination of this step is affirmative, that is, in the case in which the driver no longer intends to decelerate, SA14 is executed.

At the next step SA12, a determination of whether synchronization to the gear after the gear shift has been completed is made, for example, by determining whether the turbine rotational speed $N_T$ of the torque converter 32 has reached a pre-established prescribed rotational speed that is slightly lower than the synchronization rotational speed in the gear after the gear shift (first gear (1st) in this embodiment). If the result of the determination of this step is affirmative, the next step SA13 is executed. However, if the result of the determination of this step is negative, the determination at SA11 is executed again.

The processing of SA13, which corresponds to the second sweep-down executing device 128, is executed in the case in which the previous SA9 determines that the driver does not intend to decelerate, in the case in which the previous SA12 determines that the synchronization is completed, and in the case in which the result of the determination at SA14, described below, is negative. At SA13, the second sweep-down executing device 128 continuously decreases the engagement pressure $P_{B1}$ of the brake B1 to place the brake B1 into the disengaged condition. At SA13, an instruction is given to continuously decrease the engagement pressure $P_{B1}$ of the brake B1 from the engagement pressure at the point in time that SA13 is executed. In the case in which SA13 is executed because the result of the determination at SA12 is affirmative, the ECU 90 executes the first control in the second sweep-down executing device 128. In the case in which SA13 is executed because the result of the determination of SA14 was negative, the second control in the second sweep-down executing device 128 is executed.

At SA14, in the case in which the determination is made at SA11 that the driver no longer intends to decelerate, a determination of whether the time at which the intent to decelerate no longer exists is within a pre-established prescribed time from the increase correction of the engagement pressure $P_{B1}$ of the brake B1 at SA10 is made. If the result of the determination at this step is affirmative, that is, in the case in which the point in time at which the intent of the driver to decelerate ceases to exist is within the pre-established prescribed time after the increase correction of the engagement pressure of the brake B1, the following step SA15 is executed. If the result of the determination at this step is negative, that is, in the case in which the intent of the driver to decelerate ceased to exist at a time that was after the pre-established prescribed time after the increase correction of the engagement pressure $P_{B1}$ of the brake B1, the above-noted SA13 is executed.

The processing of SA15, which corresponds to the second sweep-down executing device 128 is executed in the case in which the result of the determination at the previous SA14 is affirmative. At S15 the second sweep-down executing device 128 the engagement pressure $P_{B1}$ of the brake B1 is swept down, and the brake B1 is placed in the completely disengaged condition. At SA15, the third control in the second sweep-down executing device 128 is executed, in which an instruction is performed to sweep down the engagement pressure $P_{B1}$ of the brake B1 from the value of the engagement pressure $P_{B1}$ of the brake B1 before the increase control by SA10.

Figure 13:
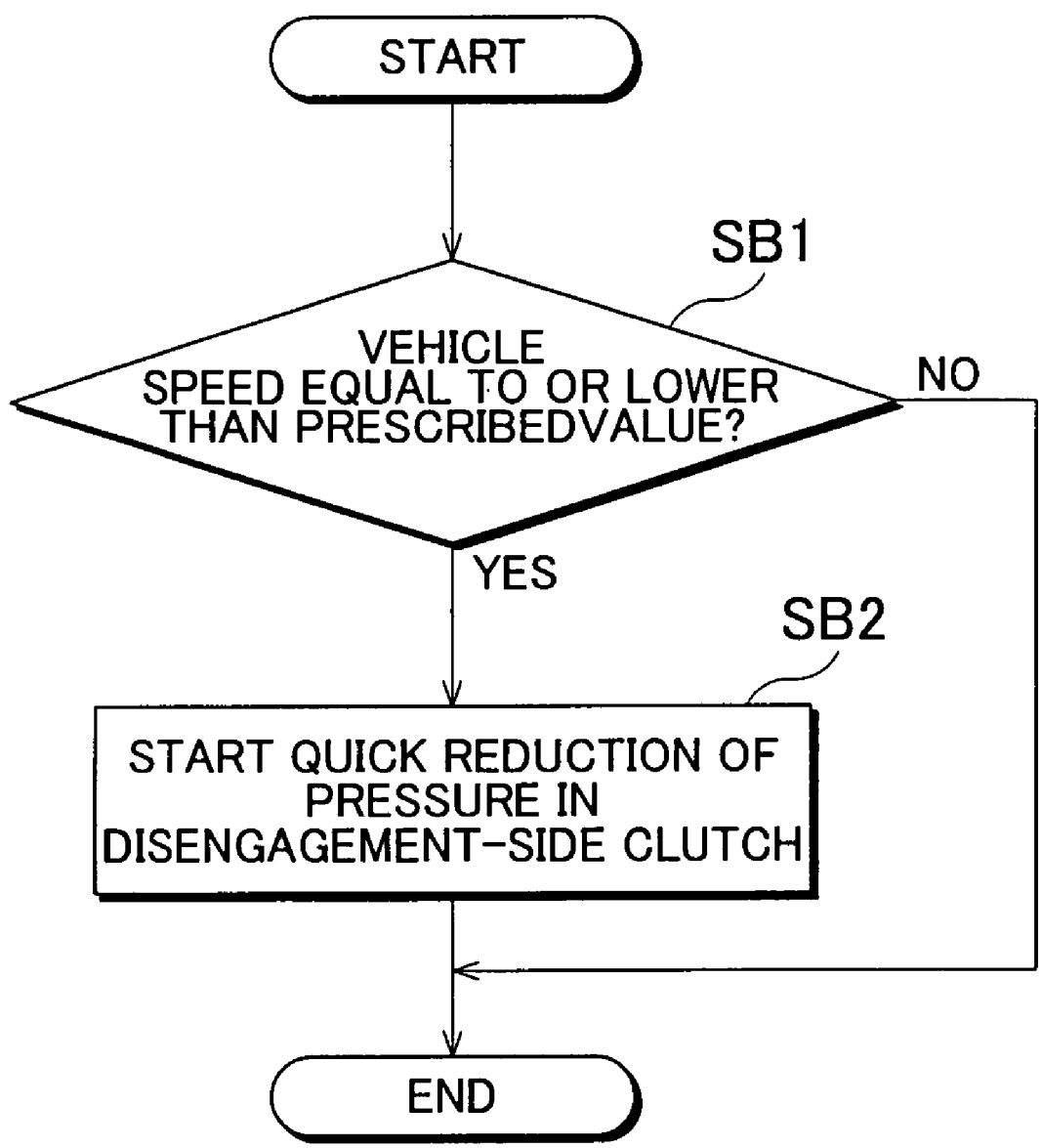
FIG. 13 is a flowchart describing a routine executed as an interrupt during the execution of the processing in the flowchart of FIG. 12A and FIG. 12B.

FIG. 13 is a flowchart showing the operation corresponding to the quick pressure-draining device 130. The routine of FIG. 13 is repeatedly executed as an interrupt with a pre-scribed time period, during execution of the flowchart of FIG. 12A and FIG. 12B. The operation of the routine is described below.

At SB1, a determination of whether the vehicle speed V is equal to or less than a pre-established prescribed value is made. If the result of the determination at this step is affirmative, that is, if the vehicle speed V is equal to or less than the pre-established prescribed value, it is assumed that the hill-hold phenomenon could occur and the next step SB2 is executed. However, if the result of the determination at this step is negative, that is, if the vehicle speed V is greater than the pre-established prescribed value, this routine is ended, and the continuation of the flowchart of FIG. 12A and FIG. 12B is executed.

At the following step, SB2, the engagement pressure $P_{B1}$ of the brake B1 is quickly reduced. For example, this reduction is done more quickly than the decrease of the engagement pressure $P_{B1}$ of the brake B1 by the second sweep-down executing device 128. Specifically, more quickly reducing the engagement pressure is, for example, making a setting with respect to the solenoid valve SL5 (refer to FIG. 7) for the engagement pressure $P_{B1}$ of the brake B1 to cause a faster reduction than the reduction of the engagement pressure $P_{B1}$ of the brake B1 by the second sweep-down executing device 128, or instructing to output a pressure that is lower than the piston stroke end pressure.

Figure 14:
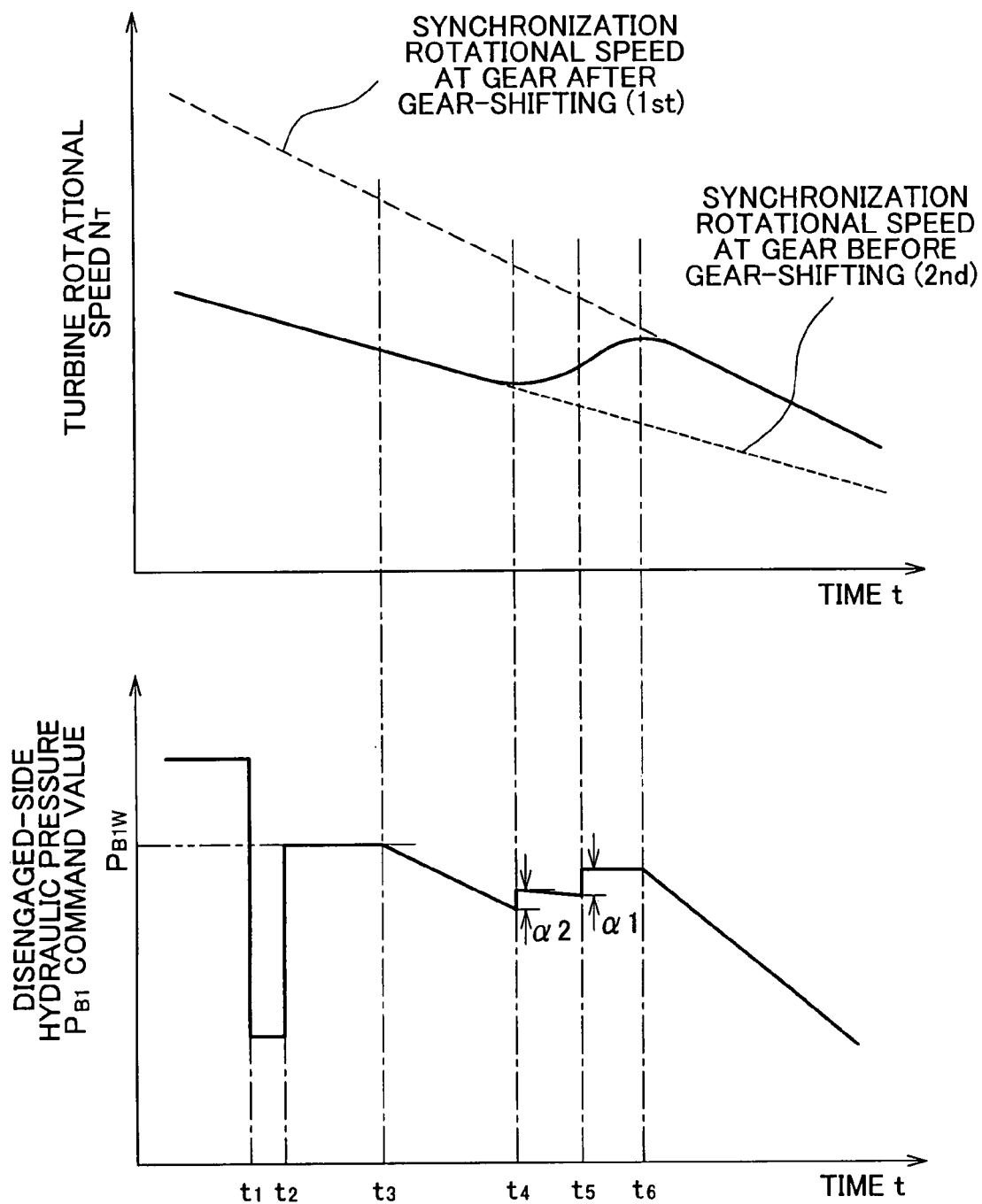
FIG. 14 is a timing diagram describing, using the example of a downshift control operation by the electronic control unit of FIG. 4, the hydraulic pressure command value with respect to the engagement-side hydraulic frictional engagement device and the turbine rotational speed in performing a downshift from a second gear to a first gear.

FIG. 14 is a timing diagram that shows the time variation of the command value of the turbine rotational speed $N_T$ at the time of execution of the gear shift from the second gear (2nd) to the first gear (1st) of the automatic transmission 10 to which this embodiment is applied, and the engagement pressure $P_{B1}$ of the brake B1, which is the disengaged-side engaging element.

At the time $t_1$, a gear shift from the second gear to the first gear is determined by the gear shift determining device 102 (SA1), and the gear shift by the transmission controlling device 100 is executed. The engagement pressure $P_{B1}$ of the brake B1, which is the engaging element to be disengaged is calculated by the standby pressure calculating device 106 (SA2) and, the engagement pressure $P_{B1}$ of the brake B1 is made to $P_{B1W}$ by the standby pressure executing device 118 (SA3). When doing this, during the time from $t_1$ to $t_2$ quick-drain processing is performed, in which, to improve the tracking of the engagement pressure $P_{B1}$ of the brake B1, an instruction is given for a value that is smaller than the standby pressure $P_{B1W}$.

Next, at time $t_3$, by a prescribed time elapsing after the engagement pressure $P_{B1}$ of the brake B1 becomes the standby pressure $P_{B1W}$, the engagement pressure $P_{B1}$ of the brake B1 is gradually reduced by the first sweep-down executing device 120 (SA4).

At time $t_4$, the start of the inertial phase, that includes a change in the turbine rotational speed $N_T$ of the torque converter 32, is determined by the inertial-phase start time determining device 110 (SA5), and further, the engagement pressure $P_{B1}$ of the brake B1 is increased by the inertial-phase starting-time engagement pressure correcting device 122 (SA6) by an amount of a second prescribed amount of $\alpha 2$, for example, by a single step in a stepwise manner.

After the above, from the time $t_4$ to the time $t_5$, the differential rotation $N_{Tdiff}$ and $dN_{Tdiff}/dt$, which is the amount of change of calculated $N_{Tdiff}$ in a considerably small unit of time, are calculated by the differential rotation calculating device 112 and, based on these values, the engagement pressure $P_{B1}$ of the brake B1 is adjusted, so that the gear shifting operation does not stop, by the gear shift progression controlling device 124 (SA7). Then, control by the gear shift progression controlling device 124 (SA7) is performed until, for example, a determination is made, by the differential rotation $N_{Tdiff}$ decreasing to below a pre-established prescribed value, that the degree of progression of the gear shift has reached a prescribed value.

Continuing, a determination of whether the driver intends to decelerate is made by the deceleration intent determining device 114 (SA9), by, for example, pressing the brake pedal 54. If the intent to decelerate is determined, the synchronization predicting device 116 predicts the time required for completion of synchronization to the gear after the gear shift. Then, at a time $t_5$, which is before the predicted time for completion of the synchronization, the engagement pressure $P_{B1}$ of the brake B1 is increased by an amount of a first prescribed amount of $\alpha 1$ by a single step in a stepwise manner.

After the above, if a determination of the driver still intends to decelerate is made (SA11) and, as the gear shift progresses, at time $t_6$, by the turbine rotational speed $N_T$ of the torque converter 32 decreasing to below the synchronization rotational speed of the gear after the gear shift (first gear (1st)) by a prescribed amount, the inertial phase ends and, if a determination of the synchronization has been completed is made, the engagement pressure $P_{B1}$ of the brake B1 is continuously decreased to completely disengage the brake B1.

In this manner, according to the embodiment, the ECU 90, which corresponds to the transmission controlling apparatus for an automatic transmission for a vehicle, has a synchronization-time engagement pressure correcting device 126 that, before synchronization of a gear shift, makes an increase correction of the engagement pressure $P_{B1}$ of the brake B1 by an amount of first prescribed amount $\alpha 1$, to synchronize the one-way clutch F1 during the decrease of the turbine rotational speed $N_T$ after increasing the turbine rotational speed $N_T$ during the decrease of the turbine rotational speed $N_T$. The ECU 90 can, therefore, cause the rate of change of the input shaft rotational speed $N_{IN}$ of the automatic transmission 10 to approach the rate of change of a rotational speed calculated by multiplying an output shaft rotational speed $N_{OUT}$ by a gear ratio $\gamma 1$ of the first gear (1st), which is the gear after gear-shifting the automatic transmission, thereby reducing the occurrence of gear shifting shock.

Also, according to this embodiment, the first prescribed amount $\alpha 1$ is determined based on at least one of the deceleration CR of the vehicle that indicates the degree of the speed reduction of the vehicle, the amount of change $dN_T/dt$ of a turbine rotational speed $N_T$ of the torque converter 32 mounted aboard the vehicle, a vehicle speed V, an idling rotational speed of the engine 30, an idling torque of the engine 30, an amount of change $N_{Tdiff}/dt$ of the differential rotation $N_{Tdiff}$ that is the difference between an output shaft rotational speed $N_{OUT}$ in a gear of the automatic transmission after a gear shift and an input shaft rotational speed $N_{IN}$ of the automatic transmission, and an input torque of the automatic transmission. Therefore, the first prescribed amount $\alpha 1$ is based on a measurable index that represents the condition of the vehicle at the time of executing the gear shift.

Also, according to this embodiment, the ECU 90 has a deceleration intent determining unit 114 that determines whether a driver intends to decelerate during a gear shift. The increase correction of the engagement pressure $P_{B1}$ of the brake B1, which the disengaged-side engaging element, by the synchronization-time engagement pressure correction device 126 performs increasing of the engagement pressure $P_{B1}$ of the brake B1, which is the disengagement-side engaging element, only in the case in which the deceleration intent determining device 114 determines that the driver intends to decelerate. For example, by an increase of the output shaft rotational speed $N_{OUT}$ during execution of the gear shift during deceleration CR of the vehicle, it is possible to prevent the differential rotation $N_{Tdiff}$ between the input shaft rotational speed $N_{IN}$ and output shift rotational speed $N_{OUT}$ of the automatic transmission during the execution of the gear shift increases, which would cause a tendency for gear shifting shock to occur, is prevented.

Also, according to this embodiment, in the case in which the deceleration intent determining device 114 determines that the intent of the driver to decelerate ceases to exist after the synchronization-time engagement pressure correcting device 126 performs increase correction of the engagement pressure $P_{B1}$ of the brake B1, which is the disengagement-side engaging element, the engagement pressure $P_{B1}$ of the brake B1, which is the disengagement-side engaging element, is continuously decreased to completely disengage the brake B1. The ECU 90, therefore, causes quick progression of the gear shift and not only prevents delay in the progression of the gear shift by excessive torque capacity of the disengagement-side engaging element is prevented, but also prevents the occurrence of delayed gear shifting shock.

Also, according to the embodiment, immediately after performance by the synchronization-time engagement pressure correcting device 126 of an increase correction of the engagement pressure $P_{B1}$ of the brake B1, which is the disengaged-side engaging element, and before the increase of the engagement pressure, although the engagement pressure command value is increased, the actual engagement pressure has not risen to the command value due to the delay in the response of the hydraulic pressure. Therefore, immediately after the increase correction is performed and before the increase of the engagement pressure, if the deceleration intent determining device 114 determines that the driver no longer intends to decelerate, the synchronization-time engagement pressure correcting device 126 continuously decreases the engagement pressure $P_{B1}$ of the brake B1, which is the disengaged-side engaging element, from the engagement pressure before the increase correction, thereby enabling faster progression of the gear shift. The ECU 90 prevents delay in the progression of the gear shift by excessive torque capacity of the disengagement-side engaging element, and also prevents the occurrence of delayed gear shifting shock.

According to this embodiment, because the deceleration intent determining device 114 determines that the driver intends to decelerate by the brake pedal 54 being on, it easily detects the intent of the driver to decelerate.

According to this embodiment, the ECU 90 further has an inertial-phase starting-time engagement pressure correcting device 122 that, at the start of the inertial phase of a gear shift, increase corrects the engagement pressure $P_{B1}$ of the brake B1, which is the disengaged-side engaging element, by an amount of a second prescribed amount α2 for example, by a single step in a stepwise manner. Therefore, the ECU 90 is possible to consider the delay in the response of the hydraulic pressure, thereby prevents gear shifting shock in the vehicle caused by a sudden drop in the engagement pressure $P_{B1}$ of the brake B1, which is the disengaged-side engaging element, and prevents a deterioration of the control of the torque capacity of the brake B1, which is the disengaged-side engaging element.

Also, according to this embodiment, because the ECU 90 further has a gear shift progression controlling device 124 that, after the engagement pressure $P_{B1}$ of the brake B1, which is the disengaged-side engaging element, rises by the increase correction of the engagement pressure $P_{B1}$ of the brake B1, which is the disengaged-side engaging element, by the inertial-phase starting-time engagement pressure correcting device 122, adjusts the engagement pressure PB1, based on an index representing the degree of progression of the gear shift, to the content of the gear shift stopping or reversing. Therefore, the ECU 90 can prevent extremely slow progress of the gear shift or reversal of the gear shift.

According to this embodiment, the index representing the degree of progression of the gear shift is an index that can represent the progress of the gear shift, and that is an easily detected value based on at least one of a differential rotation $N_{Tdiff}$ that is the difference between an output shaft rotational speed $N_{OUT}$ in a gear of the automatic transmission after a gear shift and an input shaft rotational speed $N_{IN}$ of the automatic transmission, an amount of change $dN_{Tdiff}/dt$ in a considerably small unit of time of the differential rotation, and a turbine rotational speed of a torque converter.

According to this embodiment, because the ECU 90 further has a standby pressure calculating device 106 that sets the standby pressure $P_{B1W}$, which is the engagement pressure immediately before the engagement pressure $P_{B1}$ of the brake B1, which is the disengaged-side engaging element, is actually reduced, based on an index that represents the running condition of the vehicle. Therefore, the ECU 90 can compensate for the variation in the gear shifting point, and improve the robustness of the control for preventing gear shifting shock.

According to this embodiment, because the index that represents the running condition of the vehicle is at least one of the vehicle speed V and, the slip amount $N_{Tslip}$ of the torque converter 32 provided in the in the vehicle, that is the difference between the engine rotational speed $N_E$ and the turbine rotational speed $N_T$, it is possible to detect the input torque of the automatic transmission 10, and the standby pressure $P_{B1W}$ is set in response to the input torque of the automatic transmission 10.

According to this embodiment, the ECU 90 further has a quick pressuring-draining device 130 that, in the case in which, during the execution of a gear shift, the vehicle speed V is equal to or less than a prescribed value, quickly reduces engagement pressure $P_{B1}$ of the brake B1, which is the disengaged-side engaging element. The ECU 90, therefore, prevents, for example, on an upgrade in a condition in which the brake B1, which is the disengaged-side engaging element, is not completed disengaged, in which the entire load of the vehicle is borne by the brake B1, which is the disengaged-side engaging element that is not fully disengaged, and the hill-hold phenomenon, in which the vehicle is caused to stop on the upgrade, wherein the load on the brake B1, which is the disengaged-side engaging element, becomes large.

While the above is a description of an embodiment of the invention based on the drawings, the invention can be applied to other aspects as well.

For example, although the gear shift progression controlling device 124 continuously decreases the engagement pressure $P_{B1}$ of the brake B1 based on the differential rotation $N_{Tdiff}$ and $dN_{Tdiff}/dt$, which is the amount of change thereof in a considerably small unit of time, alternatively or in addition, the engagement pressure $P_{B1}$ of the brake B1 may be continuously reduced based on the turbine rotational speed $N_T$ of the torque converter 32.

Also, although in this embodiment the ECU 90 uses the turbine rotational speed $N_T$ of the torque converter 32, a value that is one-to-one related thereto and easily varied, for example the rotational speed $N_{IN}$ of the input shaft 22 of the automatic transmission 10 detected by the input shaft rotational speed sensor 84 may be used.

Although in this embodiment the increase correction of the engagement pressure $P_{B1}$ of the brake B1 by the inertial-phase starting-time engagement pressure correcting device 122 and the synchronization-time engagement pressure correcting device 126 is performed so that the command value of the engagement pressure $P_{B1}$ is a single step in a stepwise manner, this is not a restriction, and a command in a multistep in a stepwise manner may be used.

Although in this embodiment the transmission controlling device 100 uses the various devices shown in FIG. 8, it is possible to achieve a reduction in the gear shifting shock accompanying the engagement of the one-way clutch F1 if there is minimally the synchronization-time engagement pressure correcting device 126, which increase corrects the engagement pressure $P_{B1}$ of the brake B1, which is the disengaged-side engaging element by the amount of the first prescribed amount α1, for example, by a single step in a stepwise manner, before synchronization of the gear shift.

Additionally, although they are not individually shown by examples, the invention can be embodied with a variety of modifications within the spirit of the invention.

What is claimed is:

1. In an automatic transmission for a vehicle that establishes a plurality of gears having different gear ratios by selectively engaging a plurality of engaging elements and a one-way clutch, a gear shift controlling apparatus of the automatic transmission for a vehicle that performs gear-shifting by disengaging the disengaged-side engaging element and by engaging the one-way clutch from a disengaged condition when the vehicle speed is reduced; comprising;

a synchronization-time engagement pressure correcting device that, before synchronization of gear-shifting, makes an increase correction of an engagement pressure of the disengaged-side engaging element by a first prescribed amount, to cause an input shaft rotational speed immediately before synchronizing of the automatic transmission to approach a rotational speed calculated by multiplying an output shaft rotational speed by a gear ratio of a gear after gear-shifting the automatic transmission; and a deceleration intent determining device that determines whether a driver intends to decelerate during gear-shifting, wherein after the synchronization-time engagement pressure correcting device performs the increase correction of the engagement pressure of the disengaged-side engaging element, in a case in which the deceleration intent determining device determines that the driver no longer intends to decelerate, the synchronization-time engagement pressure correcting device continuously reduces the engagement pressure of the disengaged-side engaging element to cause disengagement of the disengaged-side engaging element.

2. The controlling apparatus of an automatic transmission for a vehicle according to claim 1, wherein the increase correction of the engagement pressure of the disengaged-side engaging element by the synchronization-time engagement pressure correcting device causes the engagement pressure to increase in one step or in a plurality of steps.

3. The controlling apparatus of an automatic transmission for a vehicle according to claim 1, wherein the first prescribed amount is determined based on at least one of the deceleration of the vehicle that indicates the degree of the speed reduction of the vehicle, an amount of change of a turbine rotational speed of a torque converter mounted aboard the vehicle, a vehicle speed, an idling rotational speed of an engine, an idling torque of the engine, an amount of change of a differential rotation that is the difference between the output shaft rotational speed in the gear after gear-shifting the automatic transmission and the input shaft rotational speed of the automatic transmission, and an input torque of the automatic transmission.

4. The controlling apparatus of an automatic transmission for a vehicle according to claim 1, wherein the increase correction of the engagement pressure of the disengaged-side engaging element by the synchronization-time engagement pressure correcting device is performed in a case in which the deceleration intent determining device determines that the driver intends to decelerate.

5. The controlling apparatus of an automatic transmission for a vehicle according to claim 4, wherein the deceleration intent determining device determines that the driver intends to decelerate based on a brake pedal being on.

6. The controlling apparatus of an automatic transmission for a vehicle according to claim 1, wherein, immediately after the synchronization-time engagement pressure correcting device performs the increase correction of the engagement pressure of the disengaged-side engaging element, and before the engagement pressure actually increases, in the case in which the deceleration intent determining device determines that the driver no longer intends to decelerate, the synchronization-time engagement pressure correcting device continuously reduces the engagement pressure of the disengaged-side engaging element from the engagement pressure before the increase correction.

7. The controlling apparatus of an automatic transmission for a vehicle according to claim 1, further comprising;

an inertial phase starting-time engagement pressure correcting device that makes the increase correction of the engagement pressure of the disengaged-side engaging element by a second prescribed amount at the time of starting an inertial phase in gear-shifting.

8. The controlling apparatus of an automatic transmission for a vehicle according to claim 7, further comprising;

a gear shift progression controlling device that adjusts the engagement pressure to prevent gear-shifting from stopping or reversing based on an index that indicates a gear-shifting progression after in which the inertial phase starting-time engagement pressure correcting device performs the increase correction of the engagement pressure of the disengaged-side engaging element to increase the engagement pressure of the disengaged-side engaging element.

9. The controlling apparatus of an automatic transmission for a vehicle according to claim 8, wherein the index that indicates the gear-shifting progression is at least one of a differential rotation that is the difference between the output shaft rotational speed in the gear after gear-shifting the automatic transmission and an input shaft rotational speed of the automatic transmission, an amount of change in a unit of time of the differential rotation, and a turbine rotational speed of a torque converter.

10. The controlling apparatus of an automatic transmission for a vehicle according to claim 1, further comprising;

a standby pressure calculating device that calculates a standby pressure in gear-shifting, which is the engagement pressure immediately before a decrease of the engagement pressure of the disengaged-side engaging element, based on an index that indicates the running condition of the vehicle.

11. The controlling apparatus of an automatic transmission for a vehicle according to claim 10, wherein the index that indicates the running condition of the vehicle is at least one of a vehicle speed of the vehicle, and a slip amount of the torque converter mounted aboard the vehicle, which is the difference between an engine rotational speed and an turbine rotational speed.

12. The controlling apparatus of an automatic transmission for a vehicle according to claim 1, further comprising;
 a quick pressure-draining device that rapidly decreases the engagement pressure of the disengaged-side engaging element in a case in which the vehicle speed becomes equal to or lower than a prescribed value during gear-shifting.

13. In an automatic transmission for a vehicle that establishes a plurality of gears having different gear ratios by selectively engaging a plurality of engaging elements and a one-way clutch; a method for controlling a gear shift of the automatic transmission for a vehicle that performs gear-shifting by disengaging the disengaged-side engaging element and by engaging the one-way clutch from a disengaged condition when the vehicle speed is reduced; comprising;
 before synchronization of gear-shifting, performing an increase correction of an engagement pressure of the disengaged-side engaging element by a first prescribed amount, to cause an input shaft rotational speed immediately before synchronizing of the automatic transmission to approach a rotational speed calculated by multiplying an output shaft rotational speed by a gear ratio of a gear after gear-shifting the automatic transmission;
 wherein in a case in which the determination that a driver no longer intends to decelerate is made after the increase correction of the engagement pressure of the disengaged-side engaging element is performed, the engagement pressure of the disengaged-side engaging element is continuously reduced to cause disengagement thereof.

* * * * *